United States Patent [19]

Burton et al.

[11] Patent Number: 5,789,578
[45] Date of Patent: Aug. 4, 1998

[54] METHODS FOR THE PREPARATION OF RESINS WITH LIGANDS ATTACHED THERETO THROUGH A LINKING GROUP COMPRISING SULFIDE, SULFOXIDE OR SULFONE FUNCTIONALITY

[75] Inventors: Simon C. Burton; David R. H. Harding, both of Palmerston North, New Zealand

[73] Assignee: Massey University, Palmerton North, New Zealand

[21] Appl. No.: 584,423

[22] Filed: Jan. 11, 1996

[51] Int. Cl.$^6$ .................................................. C08B 37/02
[52] U.S. Cl. ........................ 536/56; 536/112; 536/114; 536/122
[58] Field of Search ........................... 536/56, 112, 114, 536/122

[56] References Cited

U.S. PATENT DOCUMENTS

| | | | |
|---|---|---|---|
| 2,607,776 | 8/1952 | Vinton | 546/340 |
| 4,048,416 | 9/1977 | Axen et al. | 525/61 |
| 4,237,267 | 12/1980 | Okuyama et al. | |
| 4,415,428 | 11/1983 | Nochumson et al. | 204/606 |
| 4,415,678 | 11/1983 | Lee et al. | |
| 4,973,683 | 11/1990 | Lindgren | 536/120 |

FOREIGN PATENT DOCUMENTS

| | | |
|---|---|---|
| 0 087 995 | 9/1983 | European Pat. Off. . |
| 295073 | 12/1988 | European Pat. Off. . |
| 2605237 | 4/1988 | France . |
| 4-76001 | 3/1992 | Japan . |
| WO94/04192 | 3/1994 | WIPO . |

OTHER PUBLICATIONS

Axen, et al., *Acta Chem. Scand. B*, 29:471–474 (1975).
Bauer and Gardella, *J. Org. Chem.*, 26:82–85 (1961).
Brandt, Johnny, et al. *Acta Chem. Scand.* B 30(9):815–819 (1976).
Brandt, Johnny, et al. *Journal of Solid–Phase Biochemistry*, 2(2):105–109 (1977).
Cadogan and Perkins, *The Chemistry of Alkenes*, Patai (Editor), John Wiley and Sons, Ltd., Editors, p. 600 (1964).
Caron, Marc G., et al. *The Journal of Biological Chemistry* 254(8):2923–2927 (1979).
Cunneen, J.I., *The Addition of Thio–compounds to Olefins* (Part I), pp. 36–40 (1947).
Cunneen, J.I., *The Addition of Thio–compounds to Olefins* (Part II) pp. 134–141 (1947).
Goethals, E.J., et al. *Die Makromolekulare Chemie* 93:259–261 (1966).
Griesbaum, Karl, *Angew. Chem. Int. Ed.* 9(4) (1970).
Heasley, Victor L. et al., *J. Org. Chem.* 48(8):1377–1378 (1983).
Kharasch, et al., *Chemistry and Industry*, 57:774–775 (1938).
Kharasch, et al., *Chemistry and Industry*, 57:752 (1938).
Kharasch and Langford, *J. Org. Chem.*, 28:1901–1903 (1963).
Knight et al., *J. Am. Chem. Soc.*, 75:6212–6215 (1953).
McMurray, *Organic Chemistry*, 2nd Edition, Brooks/Cole Publishing Co., p. 683 (1988).
Petrus, L. et al., *Chem. Zvesti*, 38(1):133–135 (1984).
Reid, *The Organic Chemistry of Bivalent Sulfur*, vol. 1, Chemical Publishing Co., New York, pp. 18–40 (1958).
Sundberg and Porath, *J. Chromatogr.*, 90:87–98 (1974).
Walling, *Free Radicals in Solution*, pp. 314–327, Wiley Publisher (1957).

*Primary Examiner*—Nathan M. Nutter
*Attorney, Agent, or Firm*—Burns, Doane, Swecker & Mathis, LLP

[57] ABSTRACT

Disclosed are methods for the preparation of resins comprising a support matrix having ligands capable of binding a target compound covalently attached thereto through a linking group comprising sulfide, sulfoxide, or sulfone functionality. Specifically, in the disclosed methods, a support matrix comprising ethylenically unsaturated functionality is converted to sulfide linkage by contact with a thiol group under free radical reaction conditions and subsequent optional oxidation of the sulfide to the sulfone or sulfoxide functionality.

20 Claims, 3 Drawing Sheets

FIG. 1

Product A1 is expected to predominate greatly if dilute bromine water is used.

METHODS FOR THE PREPARATION OF RESINS WITH LIGANDS ATTACHED THERETO THROUGH A LINKING GROUP COMPRISING SULFIDE, SULFOXIDE OR SULFONE FUNCTIONALITY

BACKGROUND OF THE INVENTION

Field of the Invention

This invention is directed, in part, to methods for the preparation of resins comprising a support matrix having ligands capable of binding a target compound covalently attached thereto through a linking group comprising sulfide, sulfoxide, or sulfone functionality. Specifically, in such methods, a support matrix comprising ethylenically unsaturated functionality is converted to sulfide linkage by contact with a thiol group under free radical reaction conditions and subsequent optional oxidation of the sulfide to the sulfone or sulfoxide functionality.

This invention is directed further, in part, to methods for the preparation of resins comprising a support matrix having ligands capable of binding a target compound covalently attached thereto through a linking group which ligands terminate in a sulfonate group. Specifically, in such methods, a support matrix comprising ethylenically unsaturated functionality is contacted with a bisulfite salt under free radical conditions to provide for a terminal sulfonate group.

REFERENCES

The following publications, patents and patent applications are cited in this application as superscript numbers:

1. Burton, et al., U.S. patent application Ser. No. 08/268,178, filed Jun. 29, 1994 for "Chromatographic Resins and Methods for Their Use".
2. Burton, et al., U.S. patent application Ser. No. 08/311,100, filed Sep. 23, 1994 for "Chromatographic Resins and Methods for Their Use".
3. Axen, et al., Acta Chem. Scand. B. 29:471–474 (1975)
4. Sundberg and Porath, J. Chromatogr., 90:87–98 (1974)
5. Lindgren, U.S. Pat. No. 4,973,683, for "Method of Cross-Linking a Porous Polysaccharide", issued Nov. 27, 1990.
6. Lindgren, International Patent Application Publication No. WO 94/04192, for "Method for Binding to Polymers", published Mar. 3, 1994.
7. Hjerten, et al., Chromatographia, 31(1–2):85–94 (1991)
8. Nochumson, U.S. Pat. No. 4,415,428, for "Support for Electrophoresis", issued Nov. 15, 1983.
9. Sawato and Yagi, Japanese Patent Application Publication No. 4-76001
10. Kharasch, et al., Chemistry and Industry, 57:774–775 (1938).
11. Kharasch, et al., Chemistry and Industry, 57:752 (1938).
12. Walling, Free Radicals in Solution, pp. 314–328, Wiley Publisher (1957).
13. Reid, The Organic Chemistry of Bivalent Sulfur, Vol. 1, Chemical Publishing Co., New York, pp. 18–40 (1958)
14. Vinton, U.S. Pat. No. 2,607,776 (1952)
15. Bauer and Gardella, J. Org. Chem., 26:82–85 (1961)
16. Kharasch and Langford, J. Org. Chem., 28:1901–1903 (1963)
17. Ivanovics and Vargha, Z. Physiol. Chem., 281:156–162 (1944)
18. McMurray, Organic Chemistry, 2nd Edition, Brooks/Cole Publishing Co., p. 683 (1988)
19. Knight et al., J. Am. Chem. Soc., 75:6212–6215 (1953)
20. Cadogan and Perkins, in The Chemistry of Alkenes, Patai (Editor), John Wiley and Sons, Ltd., Editors, p. 600 (1964)

All of the above publications, patents and patent applications are herein incorporated by reference in their entirety to the same extent as if each individual publication, patent or patent application was specifically and individually indicated to be incorporated by reference in its entirety.

STATE OF THE ART

In the chromatographic separation of compounds, a two phase system is employed, one mobile and the other stationary. Separation occurs by repeated sorption and desorption processes of the compounds during passage of the mobile phase through the stationary phase. Compounds separate according to their distribution coefficients. The more strongly a compound is adsorbed, the more it distributes to the stationary phase and the slower it moves with respect to the mobile phase.

In one embodiment the stationary phase comprises a solid phase matrix. The solid phase matrix can comprise either inorganic materials such as silica, alumina, zeolites, etc. or organic materials such as cellulose, agarose, dextran, polyacrylates, polystyrene, polyacrylamide, etc. In order to enhance the separation capacity of the solid phase matrix for a target compound or target compounds, it is commonplace to chemically modify the matrix. Such modifications include the covalent attachment of ligands to the surface of the matrix which ligands are selected to enhance the sorption of target compounds to the solid stationary matrix during the sorption stage. Sorption of the target compound to the modified matrix can become so strong that desorption of this compound from the modified matrix requires desorption conditions which are different from the sorption conditions. In a preferred embodiment, the ligands used to modify the matrix are further selected to enhance the desorption of target compounds from the solid stationary matrix during the desorption stage.[1,2]

Covalent ligand attachment is typically achieved by use of reactive functionalities on the solid support matrix such as hydroxyl, carboxyl, thiol, amino groups, and the like. Conventional chemistry permits the formation of covalent amine, ether, thio ether, amide, carbamate, urea, carboxyl ester bonds with such functionalities.

In order to enhance the sorption capacity of the ligand relative to the target compound, it is commonplace to employ a linking arm between the ligand and solid support matrix. Such linking arms are preferably 3 or more atoms in length in order that the linking arm can physically remove the ligand from the matrix thereby permitting the target compound to interact with the ligand with minimal interference from the matrix. The use of such linking arms in resin synthesis requires, however, the use of a bi- or higher-functional reagent having at least one functional group capable of reacting with a functional group on the surface of the matrix to form a covalent bond therewith and at least one functional group capable of reacting with a functional group on the ligand to form a covalent bond therewith. Examples of the use of such bifunctional reagents in the synthesis of resins comprising a solid support matrix having ligands covalently bonded thereto through a linking arm are described by Axen, et al.[3] and by Sundberg and Porath[4].

The use of such bifunctional reagents is, however, not without its difficulties. For example, during covalent coupling of the first functional group with the matrix, side reactions of the other functional group can reduce the activation level (i.e., the number of reactive groups per gram of matrix) because these side reactions can reduce or eliminate the ability of the other functional group to react with the ligand. One example of this phenomena is the unintended reaction of the second functional group with a complementary functional group on the matrix which not only eliminates the ability of the ligand to bind therewith but also leads to cross-linking of the matrices. Additionally, these side reactions can have a deleterious effect on the chromatographic properties of the resin such as reduced porosity of the resin.

One method of minimizing this problem is to use bifunctional reagents wherein one of the functional groups is either masked or requires activation into its reactive form wherein the demasking or activation is not conducted until after covalent coupling of the first functional group to the solid support matrix. Examples of this approach include the reaction of allyl bromide with a solid support matrix to covalently couple the allyl group to the matrix followed by activation of the allyl group via, for example, bromine/water to form a reactive bromohydrin, oxirane or vicinal dibromide functional group.[5,6,9] Other activation methods recited include halide activation via chlorine/water, iodine/water, $Cl_2$, $Br_2$ or $I_2$.

Notwithstanding the advantages of this approach, the use of halide activating conditions provides for intermediates which lack specificity in terms of chemical reactivity. That is to say that the resulting halohydrin, oxirane or vicinal dihalide are not selectively reactive with only limited reagents. Rather, these functional groups exhibit broad reactivities with, for example, amino groups, thiol groups, hydroxy groups, etc. Moreover, bromine water possesses significant toxicity which inhibits its widespread commercial use.

In view of the above, there is an ongoing need to provide for resin synthesis methods which are facile to conduct, are specific for the intended reactions and which can provide for high activation levels on a variety of support matrices.

SUMMARY OF THE INVENTION

This invention is directed, in part, to the discovery that ethylenically unsaturated functionality pendent to a support matrix can be covalently bound to a thiol group without the need for activation of the ethylenically unsaturated group. In this invention, direct covalent binding of the thiol group to the ethylenically unsaturated group is achieved under free radical conditions. In one embodiment, covalent coupling is achieved using a RSH thiol reagent where R is a ligand capable of binding a target compound to provide for sulfide linkage of the ligand to the support matrix through a linking arm. Optionally, oxidation of the sulfide linkage can be conducted to provide for the sulfone and sulfoxide linking groups.

Accordingly, this embodiment of the invention provides for a method for preparing chromatographic resins comprising a support matrix having ligands capable of binding a target compound covalently attached thereto through a linking group comprising sulfide, sulfoxide, or sulfone functionality which method comprises:

(a) providing a support matrix comprising ethylenically unsaturated functionality appended thereto;

(b) contacting the matrix of (a) above with a reactive thiol compound of the formula R—SH under free radical conditions sufficient to provide for covalent —SR linkage to said matrix wherein R is a ligand capable of binding a target compound; and (c) optionally oxidizing said sulfide linkage to a sulfoxide or sulfone.

In another embodiment of this invention, the ethylenically unsaturated functionality is reacted with a bisulfite salt to provide for ligands terminating in sulfonate functionality. Accordingly, this embodiment of the invention provides for a method for preparing chromatographic resins comprising a support matrix having ligands capable of binding a target compound covalently attached thereto through a linking group wherein said ligands comprise a terminal sulfonate functionality which method comprises:

(a) providing a support matrix comprising ethylenically unsaturated functionality appended thereto;

(b) contacting the matrix of (a) above with a bisulfite salt under free radical conditions sufficient to provide for covalent linkage of a sulfonate group to said matrix.

DETAILED DESCRIPTION OF THE INVENTION

This invention is directed to methods for the preparation of resins comprising a support matrix having ligands capable of binding a target compound covalently attached thereto through a linking group which ligands either comprise linking arms having sulfide, sulfoxide, or sulfone functionality or which ligands terminate in sulfonate functionality.

Prior to discussing this invention in further detail, the following terms will first be defined:

The term "resin" or "chromatographic resin" refers to a material capable of chromatographically separating a target compound from a mixture of compounds which resin comprises a support matrix, a ligand capable of binding a target compound when coupled to the matrix and a linker arm for covalently attaching the ligand to the support matrix. Multiple copies of the ligand/linking arm are found on the support matrix and the resin can be represented by the formula below:

where the terms support matrix, linking arm and ligand are as defined below, m is the ligand density on the matrix, n is the activation level of the support matrix (i.e., the number of ethylenically unsaturated groups in the resin) and m≦n. In this regard, ligand density, m, can be less than the activation level n due to incomplete reaction.

The term "support matrix" or "support" refers to a backbone material of the resin which material contains reactive functionality permitting the covalent attachment of linking arm/ligand pendent thereto. The backbone material can be inorganic (e.g., silica, alumina, etc.) or organic. When the backbone material is organic, it is preferably a polymer and suitable organic polymers are well known in the art.

The support matrix is preferably a polymeric material which can be either insoluble or soluble in the mobile phase and is sometimes referred to herein as a solid support matrix. Preferably the support matrix is a solid, insoluble material.

Solid support matrices suitable for use in the resins described herein include, by way of example, cellulose, regenerated cellulose, agarose, silica, coated silica, dextran, polymers (such as polyacrylates, polystyrene, polyacrylamide, polymethacrylamide including commercially available polymers such as Fractogel), copolymers such as copolymers of styrene and divinylbenzene), mixtures thereof and the like. Also, co-, ter- and higher polymers can be used provided that at least one of the monomers contains or can be derivatized to contain a reactive functionality in the resulting polymer. Soluble support matrices for use in the resins described herein include, by way of example, polyethylene glycol.

Reactive functionalities of the support matrix permitting covalent attachment of the ligand are well known in the art. Such groups include hydroxyl, thiol, amino and the like. Conventional chemistry permits use of these functional groups to covalently attach ligands thereto. Additionally, conventional chemistry permits the introduction of these groups on the support matrix.

The term "linking arm" refers to the group covalently linking the ligand to the support matrix. In the present case, the linking arm is the saturated form of the ethylenically unsaturated entity employed in the free radical reaction with the thiol containing ligand or the bisulfite salt. For example, when the vinyl containing entity is an allyl group, covalent linking of the ligand to the support matrix provides for a —CH$_2$CH$_2$CH$_2$— linking arm. Support matrices containing ethylenically unsaturated groups pendent thereto are well known in the art and are described, for example, by Lindgren[5,6], Hjerten, et al.[7], and Nochumson[8].

The linking arm preferably contains at least about 3 atoms in length and more preferably from about 3 to 15 atoms in length.

The term "ligand" or "thiol containing ligand" refers to a compound comprising a thiol functionality reactive with an ethylenically unsaturated group pendent to the support matrix under free radical conditions which ligand, when bound to the support matrix, is capable of binding target compounds during the sorption stage of chromatography. Binding of the target compound by the ligand attached to the support matrix can be achieved by any of the conventional means well documented in the art including, by way of example, hydrophobic interactions, hydrophilic interactions, ionic interactions, bioaffinity (e.g., enzyme/substrate), etc. The particular ligand is selected relative to the binding means desired and the ability of the ligand to react with ethylenically unsaturated groups under free radical conditions; both of which criteria are well within the skill of the art. All that is required is that the selected ligand comprise a thiol group reactive with an ethylenically unsaturated group pendent to the support matrix. The ability of the thiol group of a ligand to bind to the ethylenically unsaturated group of the support matrix can be readily ascertained by simply mixing the reagents under free radical conditions and determining whether coupling occurs.

Thiol containing ligands which are reactive with an ethylenically unsaturated group pendent to the support matrix under free radical conditions are referred to as "reactive thiol containing ligands".

In one embodiment, the thiol containing ligand comprises one or more additional functional groups selected from the group consisting of amino, hydrocarbylamino, dihydrocarbylamino, hydroxyl, carboxyl, sulfate, phosphate, heterocyclic, and carbamidine functionality. In another embodiment, the thiol containing ligand comprises only a hydrocarbyl group, i.e., R'—SH where R' is hydrocarbyl.

Examples of thiol containing ligands suitable for use herein include, by way of example only, mercaptoacetic acid, mercaptoethylpyridine, glutathione, cysteamine, mercaptobutyric acid, dithiothreitol, 2-mercaptoethanesulfonic acid, 2-mercaptoethanol, 4-mercaptophenol, 3-mercapto-1-propanesulfonic acid, 2-mercaptopropionic acid, cysteine, 3-mercaptopropionic acid, mercaptosuccinic acid, 2-naphthalenethiol, etc. Other thiol containing compounds useful in the methods described herein are described by, for example, Reid[13].

Examples of thiol containing ligands which are not especially reactive under mild free radical conditions with an ethylenically unsaturated group pendent to the support matrix include propanethiol, 4-mercaptopyridine, mercaptobenzimidazole and the ethylamide derivative of mercaptopropionic acid. For the purposes of this invention, such compounds are not reactive thiol containing ligands.

As used herein, the term "bisulfite salt" refers to [HSO$_3^-$]$_p$M salts where M is a cation and p is the valence of M.

As used herein, the term "hydrocarbyl" denotes an organic radical composed of carbon and hydrogen which may be aliphatic, alicyclic, aromatic or combinations thereof (e.g., arylalkyl). Preferably, the hydrocarbyl group is free of aliphatic unsaturation, i.e., ethylene and acetylenic unsaturation.

As used herein, the term "heterocyclic" refers to a carbocyclic group having a single ring or multiple condensed rings which can be either aromatic (e.g., pyridyl, furyl, naphthpyridinyl, quinoxalyl, quinolinyl, indolizinyl or benzo[b]thienyl) or non-aromatic (morpholine, piperidine, etc.) and having at least one hetero atom, such as N, O or S, within at least one ring. Preferably, such heterocyclic groups will comprise from 4 to 20 carbon atoms and from 1 to 3 hetero atoms.

As used herein, the term "carbamidine" refers to the functional group.

The term "target compound" refers to the particular compound or compounds one wishes to isolate from an aqueous solution. The target compound can be a protein, a peptide, a nucleotide, an oligonucleotide, a saccharide, an oligosaccharide, a carbohydrate, a steroid, a cyclic aromatic compound, a diol, an indole derivative, a pharmaceutical chemical compound or intermediate thereof, a primary or secondary cellular metabolite, and the like. The particular target compound is not critical. However, in a preferred embodiment, the target compound is selected from the group consisting of a protein or a peptide, a primary or secondary cellular metabolite, and a pharmaceutical chemical intermediate.

The term "ethylenically unsaturated group" refers to vinyl (>C═C<) or acetylenic groups (—C≡C—). Preferably, the ethylenically unsaturated group is a vinyl group and more preferably is a terminal vinyl group (i.e., >C═CH$_2$). Most preferably, the ethylenically unsaturated group is an allyl group.

The term "free radical conditions" refers to conditions where a free radical reaction can proceed. Such conditions do not include the use of anti-oxidant materials known to inhibit or terminate free radical reactions. Rather conventional reaction conditions are used which conditions may include the use of one or more free radical initiators such as oxygen, irradiation (e.g. ultraviolet light, radioactive elements (e.g., $^{60}$Co), etc.) chemical initiators such as peroxides, etc. Additionally, acidic conditions can be used. Free radical conditions also include reaction systems where no free radical catalysts are added but where sufficient dissolved oxygen, traces of peroxides, etc. exist in the reaction system that a free radical reaction will proceed.

Preferably, free radical conditions include the use of an aqueous or at least partially aqueous solution.

The term "halogen" refers to chlorine, bromine and iodine.

Methodology

The synthesis of a support matrix having ligands capable of binding a target compound covalently attached thereto through a linking group comprising sulfide functionality is effected by reaction of an ethylenically unsaturated functionality pendent to the support matrix with a reactive thiol containing ligand under free radical conditions. The reaction of thiols with ethylenically unsaturated groups is well documented for solution phase chemistry.[10–12] Surprisingly, it has been found that these known methods can be conducted on the supports wherein the ethylenically unsaturated support is covalently bound to the support thereby providing methods for synthesizing the resins of this invention.

Figure 1:
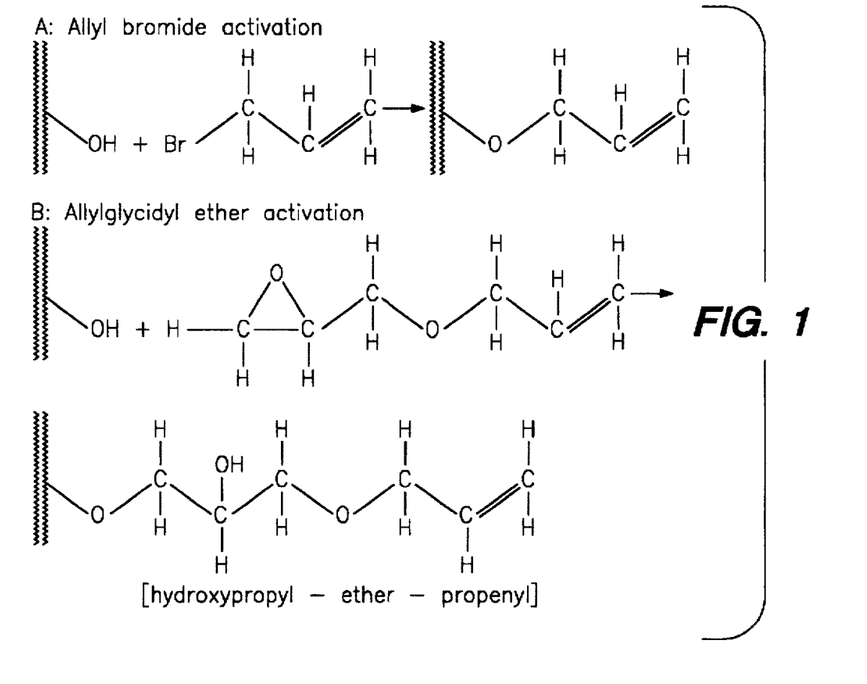
FIG. 1 illustrates known reactions used to introduce an ethylenically unsaturated moiety pendant to the support matrix.

The generation of a support matrix comprising ethylenically unsaturated groups pendent to this support is well documented in the art[5–8] and the particular route employed is not critical. In this regard, the reaction can employ, for example, allyl glycidyl ether, allyl halide or propargyl halide via conventional methods in the presence of a base to provide a support matrix having an ethylenically unsaturated entity pendent thereto. Specifically, as illustrated in FIG. 1, the halide or glycidyl group reacts with matrix hydroxyl groups at alkaline pH. Under these conditions the allyl group is expected to have limited reactivity with the matrix or water used in the reaction solution. Therefore high activation levels are possible without formation of crosslinks and/or hydrolysis of covalently attached active groups.

The ethylenically unsaturated group is then reacted under free radical conditions with the thiol containing ligand to provide for covalent linkage of the ligand. This reaction is illustrated in reaction (1) below which employs for illustrative purposes an allyl group as the ethylenically unsaturated group:

support-$(CH_2CH=CH_2)_n$+RSH→support-$(CH_2CH_2CH_2—SR)_n$ (1)

where R is a thiol containing ligand or a bisulfite salt and where "support" and n are as defined above.

Preferably, the reaction is conducted in water. However, an aqueous solution comprising a small amount of a miscible organic solvent such as dimethyl sulfoxide (DMSO), methanol, ethanol, acetone and the like can be used. Preferably, the miscible organic solvent is DMSO and more preferably the DMSO is employed at from above 0 to about 50 percent (v/v) based on the total amount of water employed.

In this reaction, free radical conditions are initiated typically by dissolved oxygen, exposed light and/or trace peroxide impurities in the reaction system. However, if desired, a free radical initiating catalyst can be employed. Such catalysts include water soluble compounds such as ammonium persulfate or alcohol soluble catalysts such as azobisisobutyronitrile (AIBN). Such catalysts are typically employed at from about 0.1 to about 5 mol percent based on the greater of the total moles of thiol or ethylenic groups in the reaction mixture.

The reaction is preferably conducted at from about 15° to 80° C., although preferably at from 20° C. to 70° C. The specific reaction temperature and reaction time will be dictated by the reagents, whether a free radical catalyst is employed, etc. which can be readily determined by the skilled artisan.

The reactions are preferably conducted at moderately acidic pHs such as from about 2.5 to about 6.2. In some cases, the pH of the reaction should be monitored to ensure adequate reactivity of the thiol containing ligand to the ethylenically unsaturated functional group. For example, at pH 3–4, 4-mercaptoethylpyridine is very reactive with ethylenically unsaturated functional groups; whereas as pH 2, the reaction does not proceed. The use of mildly acidic pHs is particularly advantageous for support matrices such as silica which is unstable in alkali.

The resulting supports can be recovered by conventional methods including, by way of example, filtration, centrifugation, etc.

When R is a bisulfite salt, the resulting compound is a sulfonate which reaction is represented as follows:

support-$(CH_2CH=CH_2)_n$ + $[HSO_3^-]_pM$ (2)

support-$(CH_2CH_2CH_2—SO_3^-M)_n$ where support and n are as defined above, M is a cation and p is the valence of M. In this reaction, the cationic charge of M is, of course, balanced by the anionic charge of support-$(CH_2CH_2CH_2—SO_3^-)$ such that if M has a charge of +2, then only ½ a mole of M is present per mole of support-$(CH_2CH_2CH_2—SO_3^-)$.

Suitable salts include metal cations of groups Ia, IIa, IIIa, IVa, Va, VIa, VIIa, VIII, Ib, IIb and IIIb of the periodic table (as set forth by Cotton & Wilkinson, Advanced Inorganic Chemistry, 3rd Ed., Interscience Publishers, Division of John Wiley & Sons, New York, New York, USA (1972)).

When R is a thiol containing ligand, the resulting sulfide can optionally be oxidized to the sulfoxide or the sulfone by conventional oxidation using, for example, oxidants such as hydrogen peroxide, metachloroperbenzoic acid, bromine water, and the like.

Utility

The methods of this invention provide for resins suitable for the chromatographic separation of a target compound or set of target compound from a mixture comprising the target compound or compounds. Separation of the target compound or compounds is achieved by sorption processes wherein the target compound or compounds have a different binding affinity to the resin as compared to at least one of the other components found in the mixture.

By selection of suitable ligands, the resins described herein can also be employed in the recovery of the target compound or compounds. Specifically, in this embodiment, the ligands employed on the resin are selected such that binding of the target compound or compounds is reversible either under the conditions employed during the sorption process or by altering the sorption process conditions such that the target compound or compounds no longer bind with the same affinity to the resin. Examples of this latter process are described in Burton et al.[1,2] which discloses the use of ligands wherein a charge can be induced on the ligand by change in pH which inducable charge can be used to affect sorption/desorption properties of the resin.

The methods of this invention provide numerous advantages over conventional coupling reactions of ethylenically unsaturated functionality using, for example, bromine/water followed by ligand attachment through bromide chemistry.

One significant advantage found in the methods described herein is that free radical addition is specific for thiol containing compounds with no cross-reactivity with amine, carboxyl and hydroxyl groups. Accordingly, the ligands employed in this invention can contain hydroxyl, amine, carboxyl groups without leading to non-specific attachment reactions on the matrix or leading to cross-linking.

Figure 2:
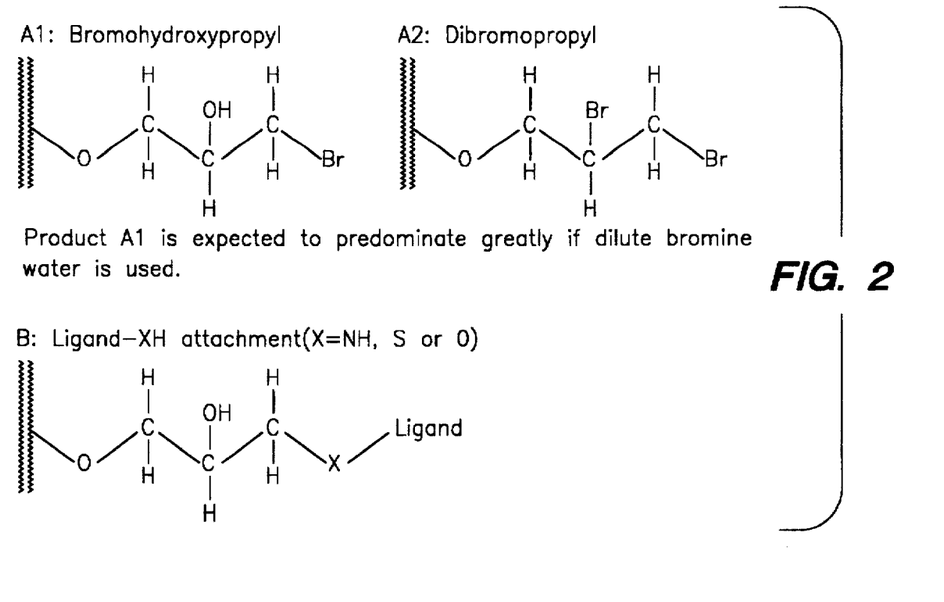
FIG. 2 Parts A1, A2 and B illustrate the reaction products obtained by use of conventional bromine water chemistry with an ethylenically unsaturated moiety of FIG. 1.
Figure 3:
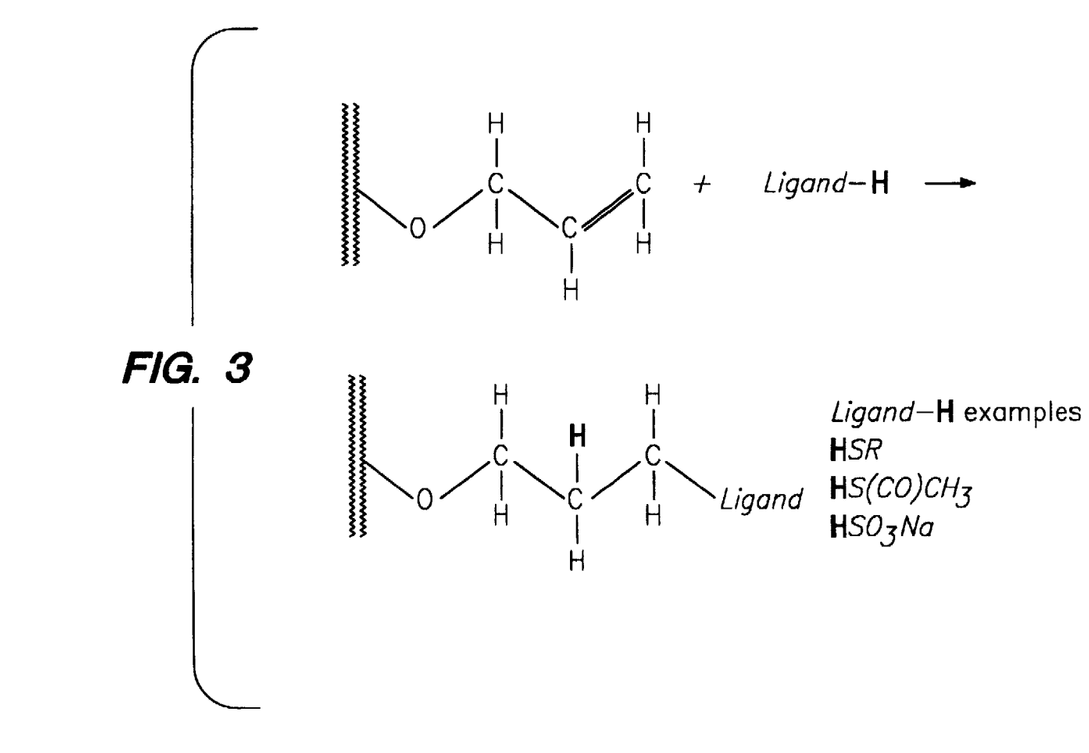
FIG. 3 illustrates the reaction products achievable by free radical addition chemistry employing thiol containing ligands.

Another advantage is that ligand coupling is accomplished with one less step than such conventional methods and the use of essentially no exogenous catalysts (although such catalysts can be employed). Also, the use of bromine or bromine/water is eliminated. This latter aspect is significant insofar as FIG. 2 illustrates that side reactions with bromine or bromine/water (or other halides) will lead to a certain level of halide incorporation into the matrix whereas the processes described herein will not. Accordingly, the methods described herein provide for a level of halide in the resulting resin of less than about 0.2% (per gram dry).

Still another advantage achieved by the methods described herein is that covalent attachment of several ligands is more efficient via the free radical process described herein as opposed to such conventional processes while still obtaining very high ligand densities.

EXAMPLES

The following examples are set forth to illustrate the claimed invention and are not to be construed as a limitation thereof.

Unless otherwise stated, all temperatures are in degrees Celsius. Also, in these examples, unless otherwise defined below, the abbreviations employed have their generally accepted meaning:

| | | |
|---|---|---|
| AB | = | allyl bromide |
| AGE | = | allyl glycidyl ether |
| APS | = | ammonium persulfate |
| BME | = | 2-mercaptoethanol |
| DMSO | = | dimethylsulfoxide |
| ECH | = | epichlorohydrin |
| g | = | gram |
| GSH | = | glutathione |
| M | = | molar |
| MAA | = | mercaptoacetic acid |
| meq | = | milliequivalents |
| mL | = | milliliter |
| mMoles | = | millimoles |
| mM | = | millimolar |
| MPA | = | mercaptopropionic acid |
| MSA | = | mercaptosuccinic acid |
| nm | = | nanometers |
| TCA | = | trichloroacetic acid |
| μL | = | microliters |

In the examples below, allyl glycidyl ether, thiolacetic acid, mercaptoacetic acid, thiosalicylic acid, cysteamine.HCl, and 3-mercaptopropionic acid were obtained from Janssen Chimica, Geel, Belgium; 4-mercaptopyridine, mercaptosuccinic acid, and thiophenol were obtained from Aldrich-Chemie, Steinheim, Germany or Aldrich Chemical Co., Milwaukee, Wis., USA; glutathione and butyrolactone were obtained from Sigma Chemical Co., St. Louis, Mo., USA; allyl bromide, cysteine, benzoyl peroxide, ammonium persulfate, calcium hydroxide, and 4-methoxyphenol were obtained from BDH, Dorset, England; 2-mercaptoethanol, barium hydroxide octahydrate and cysteine.HCl were obtained from Riedel-de Hahn, Selze, Germany; sodium sulfite was obtained from May and Baker, Manchester, England; sodium metabisulfite was obtained from Ajax Chemicals Ltd., Auburn, NSW, Australia; and thiourea was obtained from Merck, Munich, Germany. 4-Mercaptobutyric acid was prepared from butyrolactone and thiourea by the method of Kharasch and Langford[16]. 6-Mercaptohexanoic acid was prepared by the method of Ivanovics and Vargha[17] from 6-bromohexanoic acid and sodium bisulfide.

Perloza resins were from Tessek, Ltd., Prague, Czech Republic or from ICS, Prague, Czech Republic. Sepharose resins was from Pharmacia, Uppsala, Sweden. Perloza resins can also be obtained from Lovochemie, Lovosice, Czech Republic.

In the examples below, DMSO %=DMSO used (mL)/g resin. Likewise, weights of matrix given in grams refers to suction dry weights whereas weights given in grams (dry) refer to oven dried weights (~110° C. for 1 to 2 hours, cooled in a dry environment). It is understood that suction dry weights for matrices are still water solvated materials.

Example 1

Synthesis of 4-mercaptoethylpyridine.HCl

4-Mercaptoethylpyridine.HCl was prepared from 4-vinyl pyridine and thiolacetic acid by an adaptation of the method described by Vinton[14] for preparation of 2-mercaptoethylpyridine. Under stirring, 4-vinyl pyridine (95%, 250 mL) was prechilled to −30° C. (methanol/ice bath) and thiolacetic acid (170 mL) was added dropwise over a period of about 1 hour. The solution froze after 5–10 minutes and the addition rate was increased to raise the temperature to 15°–25° C. and allow efficient stirring. Further addition was controlled to maintain reaction temperature between 15°–25° C. and not exceeding 30° C. The reaction was stirred for a further 1 hour to room temperature and then overnight.

The product was mixed with ether and extracted with saturated sodium bicarbonate solution 3 times (note on the third extraction no gas was evolved). The ether layer was washed once with saturated salt solution, treated with activated charcoal to reduce color and dried over anhydrous magnesium sulfate. It was then filtered and evaporated under vacuum with a bath temp about 30° C. The resulting oil was stirred for at least 4 hours with 800 mL of 6M HCl and then the acid layer reduced under vacuum. The dried solid was slurried with isopropyl alcohol, filtered and dried to give 328 g (theoretical 387 g) of creamy white 4-mercaptoethylpyridine hydrochloride (85%), m.p. 190°–191° C. (lit. 189° C., Bauer and Gardella[15]). A repeat preparation using 206 mL vinyl pyridine, 140 mL thiolacetic acid and more efficient HCl removal gave 308 g (theoretical 318 g, yield 97%) of a creamy solid, m.p. 189°–190° C.

Example 2

Preparation of Ethylenically Unsaturated Groups Pendent to a Support Matrix This example outlines for illustrative purposes only various methods used for the preparation of ethylenically unsaturated groups pendant to a support matrix. It describes, for example, the activation of two different support matrices with two different allyl reagents under varying reaction conditions. The effects of allyl reagent concentration, solvent type, reaction temperatures and time are also examined and the resulting ligand densities are compared using various titration methods.

General Reaction Methods:

Reactions at room temperature were mixed mechanically by addition of the resin to an Ika Vibra-mix shaker unless otherwise indicated. Reactions at elevated temperature were incubated in a water bath without external mixing. Glass vials (25 mL) were used routinely for matrix samples up to 15 g. Glass jars, up to 1250 mL capacity, were used for larger reaction mixtures. Perloza 100 fine was used for activation reactions unless otherwise indicated. Perloza was washed with water or solvent exchanged to the solvent mixture used for activation and suction-dried in a sintered glass funnel. Activation mixtures were identified by the volume of allyl reagent (mL) per 100 g suction-dried matrix, expressed as a percentage.

A. Allyl Bromide Activation of Perloza

For every mole of allyl reagent used, 1–1.1 moles of hydroxide ions were used. Initial conditions employed were 60° C. using 75% DMSO solvated Perloza. No disadvantage was found by changing the reaction temperature to room temperature. The efficiency of reagent use was greater using organic solvents but high activation levels were still obtained using aqueous media. If high levels of organic solvent were used, $Ba(OH)_2$ was the preferred alkali, otherwise NaOH was used. A consistent increase in activation level was found with increasing reagent proportion (Table 1). Because only a small difference in activation was found between an aqueous mixture and a 15% DMSO mixture, aqueous activation was adopted as the standard method.

A specific example of allyl bromide activation is as follows. Perloza cellulose (MT 100 fine) was washed with 5 volumes of water (MilliQ grade) and suction dried. A 10 g quantity of the matrix was mixed with 0.8 mL allyl bromide (redistilled), 0.8 g barium hydroxide octahydrate, 2 mL DMSO and 1 mL water for 48 hours at room temperature. The activated matrix was washed with 5 volumes of a 10% DMSO/90% water mixture, 5 volumes of 0.1M HCl and 10 volumes of water. Allyl group concentration was determined by the bromine water method described in Example III below. An independent measure of allyl groups was obtained by mixing 1 g of the activated resin with 3 mL water and 100 µL of 3-mercaptopropionic acid (MPA) at 60° C. for 4 hours. This derivatized resin was washed with 20 volumes of water, 20 volumes of 0.1M NaOH, 50 volumes of water, 20 volumes of 0.1M HCl and 100 volumes of water and titrated with 0.1M NaOH. This MPA titration method can also be applied to activated matrices described above and is also described in Example III.

Additional Examples of Allyl Bromide Activation of Perloza

In some (6%) activations sodium hydroxide solutions were replaced by barium hydroxide (2 g), calcium hydroxide (0.5 g) or potassium phosphate (3 g) per mL allyl bromide used. Barium hydroxide was also used for a 10% activation of 75% DMSO solvated Perloza and a 25% activation of water solvated Perloza, both at room temperature for 24 hours.

Water solvated Perloza (5 g), 0.5 mL water and 1 mL DMSO were mixed with 0.25 mL, 0.5 mL or 0.75 mL allyl bromide (+0.5 g, 1 g or 1.5 g $Ba(OH)_2$) respectively. Further mixtures used 10 g Perloza, 2 mL DMSO and 0.8, 1 or 1.2 mL allyl bromide (1.6, 2 or 2.4 g $(Ba(OH)_2)$).

Water solvated Perloza (5 g), 0.5 mL allyl bromide and 1 g $Ba(OH)_2$ were mixed with 3 mL water or 2 mL of 12.5, 50 or 100% DMSO.

The standard reaction (24 hour) mixture was 10 g water solvated Perloza, 1.5 mL solvent, 0.7 mL allyl bromide and 2.4 mL of 3.75M NaOH. Solvents used were: DMSO, dioxane, acetone, ethanol and water. A second DMSO sample was reacted for 7 hours. A further DMSO reaction used 1.4 g $Ba(OH)_2$ and 2 mL water instead of NaOH solution.

Preferred Conditions for Allyl Bromide Activation of Perloza

Water solvated Perloza (10 g), with or without 1.5 mL DMSO, was mixed with 0.7 mL allyl bromide and 3 mL of 3M NaOH, 4.5 mL of 2M NaOH or 5 mL of 2M NaOH. The preferred conditions for a 7% activation used 4.5 mL of 2M NaOH (no DMSO). A "stock 7%" activated Perloza was prepared by reaction of 100 g Perloza with 7 mL allyl bromide and 45 mL of 2M NaOH. For other allyl bromide percentages, the volume of NaOH used was maintained between 0.4 to 0.45 mL of solution/g Perloza. However, the NaOH molarity was varied such that 12.5 to 13 mMoles of hydroxide were used per mL (approximately 12 mMoles) of allyl bromide.

A 2% allyl bromide activation of 10 g Perloza used (4.5 mL) 0.6M NaOH. A 6% activation of 50 g Perloza used 20 mL of 2M NaOH. For a 7.5% activation of 400 g Perloza, 30 mL allyl bromide and 180 mL of 2.1M NaOH were used. A stock 8% activation of 80 g Perloza used 6.4 mL allyl bromide and 35 mL of 2.3M NaOH. For "stock 10%" activation of 1% crosslinked and uncrosslinked Perloza (50 g), 5 mL allyl bromide and 21.5 mL of 3M NaOH were used. A second stock 10% activation of uncrosslinked Perloza (75 g) used 7.5 mL allyl bromide and 32 mL of 3M NaOH. A 7.5% activation of 700 g Perloza 100 medium used 52.5 mL allyl bromide and 300 mL of 2.2M NaOH.

Allyl Bromide Activation of Sepharose

Sepharose 6B (10 g) was reacted with 0.5 mL allyl bromide, 0.1 mL ECH (crosslinker) and 6 mL of 1.7M NaOH for 48 hours at room temperature. Another sample of Sepharose 6B was reacted likewise, except that 1 mL allyl bromide and 6 mL of 2.5M NaOH were used. Sepharose CL6B was reacted with 0.6 mL allyl bromide and 4.5 mL of 2M NaOH for 18 hours at room temperature.

B. Allyl Glycidyl Ether Activation of Perloza

A specific example of allyl glycidyl ether activation is as follows. Perloza cellulose (Perloza MT 100 fine beaded cellulose) was washed with 5 volumes of water (MilliQ grade water) and 3 volumes of 0.3M NaOH and suction dried. A 40 g quantity of the matrix was mixed with 12 mL of 99+% allyl glycidyl ether by vigorous shaking. The mixture was left at room temperature for 48 hours with occasional shaking. The activated matrix was washed with 10 volumes of water and suspended in 3 volumes of water. Bromine water (1%) was added slowly over 5 minutes until the mixture no longer decolorized the bromine water. The brominated resin was washed with 10 volumes of water. Allyl group concentration on the resins was determined by the amount of bromine water decolorized. The concentration of reactive bromine groups on the resin (1 g sample suspended in 9 mL water) was determined by substitution with 0.5 g sodium sulfite (4 hours, 60° C.), followed by 0.1M NaOH titration to pH 8. Similar reactions were carried out using different reaction times, temperatures, and reagent percentages.

Other alternatives include the following:

Reaction mixtures containing an organic solvent were prepared similarly, except that the Perloza (10 g) was pretreated with a mixture of 0.3M NaOH and solvent. The solvent mixtures used were 1:2 (acetone/0.3M NaOH) and 1:1 (DMSO/0.3M NaOH). These reaction mixtures had superior "fluid" properties to aqueous ones and were mixed by mechanical shaking.

Another aqueous activation was prepared without pretreatment by mixing water solvated Perloza (8 g) with 2 mL of 1.5M NaOH and 1.2 mL allyl glycidyl ether. This product was a more "fluid" slurry. A stock allyl glycidyl ether Perloza was prepared in analogous fashion by repeat aqueous slurry activation of 50 g cellulose using 15% allyl glycidyl ether followed by 12% allyl glycidyl ether (and 10 mL of 2M NaOH on each occasion). Reagents and products of the first reaction were washed out (in a sintered glass funnel) with water before the second addition of reagent and NaOH.

Results

A. Allyl Bromide Results

Allyl bromide reaction with Perloza demonstrated significantly higher activation levels than could be obtained using epichlorohydrin activation. These results were obtained using 0.3 mL allyl bromide per 10 g of 75% DMSO solvated Perloza.

These activation conditions were chosen to minimize water content and provide a slight (approximately 1.05) molar excess of hydroxide over allyl bromide. A significant reduction in matrix swollen volume (10–15% less weight of suction dried matrix after activation) was found for highly activated samples. Samples did not regain their original swollen volume upon ligand substitution. It was considered that reduced swollen volume might be caused by extensive crosslinking or by hydrophobic effects of the allyl groups. Allyl bromide should not cause crosslinking itself (Lindgren, 1994) but impurities might do so. The allyl bromide used was slightly brown colored whereas it should be colorless. A colorless reagent was obtained, by distillation, and used for subsequent experiments.

Room temperature was apparently adequate for activation because a high level (0.15 mMoles/g) was obtained after a 1 hour reaction, using the 6% allyl bromide mixture described for the 60° C. reaction. All subsequent allyl bromide activations were at room temperature but the reaction time was increased to 24 hours.

The initial pH of reaction mixtures described above would be very high (estimated to be >14) and the effect lower pHs had on the reaction was investigated. Specifically, the 2 mL of 3.75M NaOH solution used for 6% allyl bromide activation was replaced by barium/calcium hydroxide or potassium phosphate (solids) and 2 mL water. High levels of activation were obtained using Ba(OH)$_2$ (0.46 mMoles/g) but lower levels were obtained using Ca(OH)$_2$ and K$_3$PO$_4$ (each 0.1 mMoles/g). Ca(OH)$_2$ has a lower solubility than Ba(OH)$_2$ and the saturated hydroxide concentrations with respect to water were expected to be approximately 0.01M and 0.2M respectively. The pH of a 1M K$_3$PO$_4$ solution was 13 but the starting pH would not be maintained during the reaction because of buffering effects. Therefore it seemed that a base of sufficient strength to maintain the reaction pH at approximately 13–13.5 was required for optimal activation but that higher pH reduced activation efficiency. However the swollen volumes of the lower activated matrices produced using the weaker bases was not significantly altered, indicating that high levels of activation were responsible for matrix shrinkage. A very highly activated matrix (0.71 mMoles/g) was produced by increasing the proportion of allyl bromide to 1 mL per 10 g suction-dried (75% DMSO) Perloza.

Another highly substituted matrix (0.43 mMoles/g) was produced using (10 g) water solvated Perloza and 25% allyl bromide. Although reagent consumption was much higher, this reaction demonstrated that high activation levels could be obtained in aqueous media. Effective reaction occurred despite the limited solubility of allyl bromide in water.

The relationship between the ratio of reagent to cellulose and the resulting activation level for 1:6 DMSO:water solvated cellulose was determined using 5, 10 and 15% allyl bromide and Ba(OH)$_2$. The activation levels were 0.99, 1.42 and 1.97 mMoles/g (dry) respectively. The titration values increased in a roughly linear fashion. See, for example, Table 1 below. There was no indication of reduced reactivity of cellulose at increasing levels of activation. This was consistent with the extremely high activation levels obtained previously.

TABLE 1

Comparison of titration methods for varying (activation) levels of allyl bromide

| AB % | Bromine | Titration (mMoles/g) MPA | Sulfonate[1] |
|---|---|---|---|
| 5 | 0.12 | 0.116 | 0.111 |
| 10 | 0.18 | 0.174 | 0.166 |
| 15 | 0.30 | 0.273 | 0.172 |
| 10 (no DMSO) | 0.10 | 0.093 | 0.096 |

[1]Sulfonate derivatives were prepared by sulfite substitution of the brominated matrix The above 5–15% allyl bromide activation levels (mMoles/g dry) were determined by mercaptopropionic acid addition and titration (titration methods described below). Correlation with bromine water titration values (Table 1) was reasonable and the variations due to visual assessment of titration endpoint and falling bromine content over time were avoided. By contrast sulfonate titration values gave a low estimate of activation level, especially at high allyl bromide percentages. The mercaptopropionic acid titration method was used henceforth for routine assay of activation levels until mercaptopropionic acid was replaced by mercaptoacetic acid.

Allyl bromide (10%) activation of water solvated Perloza resulted in an activation level of 0.79 mMoles/g, suggesting that a small percentage of DMSO in the reaction mixture greatly enhanced efficiency. This difference was attributed to improved reagent mixing. The effect of increasing the proportion of DMSO to cellulose, using a constant amount of water and allyl bromide (10%), was to increase activation level initially but no improvement was found above 20% DMSO (Table 2). Sulfonate titration values were again low.

TABLE 2

Titration values for variations of reagent and cosolvent proportion[2]

| AB % | DMSO % | Titration (mMoles/g) MPA | Sulfonate |
|---|---|---|---|
| 10 | 5 | 0.153 | n.d. |
| 10 | 20 | 0.203 | n.d. |
| 10 | 40 | 0.197 | n.d. |
| 8 | 20 | 0.188 | 0.116 |
| 10 | 20 | 0.232 | 0.126 |
| 12 | 20 | 0.269 | 0.119 |

[2]The base was Ba(OH)$_2$

Because the water content of reaction mixtures had been greatly increased, sodium hydroxide could be used without the initial pH exceeding 14. A 7% allyl bromide activation (24 hour) with Ba(OH)$_2$, water and 15% DMSO resulted in a level of 0.183 mMoles/g. A greater activation level was obtained using 2.4 mL of 3.75M NaOH instead of Ba(OH)$_2$/water. The effect of variation of solvent type, rather than percentage, was studied using the NaOH method and results are recorded in Table 3. Equivalent activation was obtained using acetone instead of DMSO. Slightly lower activation levels resulted with dioxane and water and much lower with ethanol. A 7 hour reaction sample (DMSO) had an activation level of approximately 70% of the 24 hour reaction sample. Because an extra 1.5 mL of water was used for the aqueous sample, the difference between the aqueous and DMSO/acetone activation level may be simply attributed to the increased water:cellulose rather than the reaction being enhanced by organic solvents.

TABLE 3

Activation levels with solvent and base variations

| Cosolvent | Bromine titration mL/g | Titration (mMoles/g) | |
|---|---|---|---|
| | | MPA | Sulfonate |
| Ethanol | 1.0 | 0.121 | 0.104 |
| Water | 1.5 | 0.175 | 0.156 |
| Dioxane | 1.6 | 0.190 | 0.156 |
| Acetone | 1.7 | 0.204 | 0.157 |
| DMSO | 1.7 | 0.202 | 0.158 |
| DMSO, 7 hour | 1.2 | 0.145 | 0.124 |
| DMSO, Ba(OH)$_2$ | 1.6 | 0.183 | 0.139 |

In Table 3, uncalibrated bromine water, approximately 0.1 mMoles/mL was used. The results of this table again showed good correlation to the titration results using mercaptopropionic acid, whereas the sulfonate titration results were consistently lower. Higher substitution may be achieved by using more concentrated sodium sulfate solutions.

Examples of Sepharose Activation

Reaction of Sepharose 6B (10 g) with 5 and 10% allyl bromide resulted in (mercaptopropionic acid) titrations of 0.088 and 0.139 mMoles/g (1.60 and 1.97 mMoles/g dry). Epoxide groups introduced by ECH (included to crosslink Sepharose) were not expected to contribute significantly to the activation level. The proportion of ECH:allyl bromide was low and the majority of epoxide groups should be reacted under the activation conditions used. Reaction of Sepharose CL6B (10 g) with 6% allyl bromide also produced a highly activated matrix (1.42 mMoles/g dry).

Preferred Conditions for Aqueous Activation of Perloza

For subsequent allyl bromide activations aqueous solvation was standard. To provide optimal mixing by "external" methods (e.g., rotation rather than a paddle stirrer) 4 to 5 mL of NaOH solution was required per 10 g cellulose. This produced a free flowing slurry. Therefore the molarity rather than volume of NaOH solution was varied for different allyl bromide proportions. Similar activation (0.163–0.169 mMoles/g) of Perloza (10 g) with 0.7 mL allyl bromide was obtained using 3 mL of 3M NaOH or 4.5 mL of 2M NaOH (+/–1.5 mL DMSO). The activation using 3M NaOH was expected to give a higher result but the mixing was unsatisfactory. When 1.5 mL of DMSO was included to improve mixing, a higher activation level was obtained (0.199 mMoles/g). A much lower level (0.11 mMoles/g) was obtained when a slightly greater proportion (5 mL) of 2M NaOH was used. At the 10 g (cellulose) reaction level, a typical activation increased 0.023–0.025 mMoles/g for every percentage increase of allyl bromide. Slightly higher levels were found at the 100–400 g reaction level. These results are summarized in Table 4. In Table 4, 10 g cellulose was used, unless otherwise noted under "reaction mixture".

TABLE 4

Titration values for various allyl bromide % and 10–700 g cellulose scales

| Reaction mixture | AB % | MAA (mMoles/g) | titration (mMoles/g dry) |
|---|---|---|---|
| 4.5 mL, 0.6M | 2 | 0.051 | n.d. |
| 20 mL, 2M (50 g) | 6 | 0.139 | n.d. |
| 4.5 mL, 2M | 7 | 0.169 | 1.22 |
| 4.5 mL, 2M, 1 mL DMSO | 7 | 0.164 | 1.25 |
| 3 mL, 3M | 7 | 0.168 | 1.23 |
| 5 mL, 2M | 7 | 0.111 | 0.84 |
| 3 mL, 3M, 1.5 mL DMSO | 7 | 0.199 | 1.35 |
| 45 mL, 2M (100 g) | 7 | 0.181 | 1.36 |
| 35 mL, 2.3M (80 g) | 8 | 0.202 | 1.51 |
| 180 mL, 2.1M (400 g) | 7.5 | 0.188 | 1.46 |
| 20.5 mL, 3M (50 g) | 10 | 0.252 | 1.67 |
| 300 mL, 2.2M (700 g medium) | 7.5 | 0.26 | 1.46 | medium = medium grade of Perloza

B. Allyl Glycidyl Ether Activation Results

Allyl glycidyl ether was initially reacted with Perloza solvated with 0.3M NaOH, by analogy to the optimal hydroxide concentration reported by Sundberg and Porath[4] for bisepoxide activation. Reaction mixtures were prepared as thick suspensions by mixing allyl glycidyl ether with suction dried (NaOH solvated) cellulose. The standard amount of allyl glycidyl ether used was 0.3 mL/g (30%). Reaction at 60° C. was complete by 5 hours. The (unassayed) bromine water titration of 1.7 mL/g suction-dried Perloza was unchanged after a further 19 hours reaction. Slightly higher activation levels were obtained at 40° C. (1.8 mL/g after 24 hours) and room temperature (1.5 and 2 mL/g at 24 and 48 hours), using the same bromine water solution. The 48 hour, room temperature activation level was 0.183 mMoles/g (using assayed bromine water). This activated cellulose had a similar wet weight to the original cellulose. It was therefore assumed that matrix swollen volume was not significantly altered by activation.

A comparison of activation level for 10%, 20% and 40% allyl glycidyl ether mixtures demonstrated a lower efficiency of reagent use as the percentage used was increased (Table 5). However, a very high activation level (0.315 mMoles/g by bromine water assay) was obtained by repeat activation using 30% allyl glycidyl ether.

TABLE 5

AGE % versus activation level

| AGE % | MPA titration (mMoles/g) |
|---|---|
| 10 | 0.078 |
| 20 | 0.133 |
| 30 | 0.172 |
| 40 | 0.168 |

Allyl glycidyl ether (15%) activation (72 hours at room temperature) efficiency was compared for Perloza (10 g), solvated by 0.3M NaOH or a 50:50 DMSO/0.3M NaOH mixture. Reaction was for 72 hours at room temperature. The activation levels (mercaptopropionic acid titration) were 0.109 and 0.194 mMoles/g respectively. The higher activation level was attributed to a lower rate of hydrolysis. The rate of activation was compared for a 33% acetone solvated, 15% allyl glycidyl ether slurry and an aqueous solvated, 12% suspension. The respective titrations after 96 hours, were 1.05 and 0.703 mMoles/g dry. No increase of activation level was found after 48 hours for the aqueous method but the 33 % acetone matrices required 72 hours for complete reaction. These results are summarized in Table 6.

TABLE 6

MPA titrations for varying AGE reaction time and solvation

| Reaction time | Titration (mMoles/g dry) | |
|---|---|---|
| | Water | 33% Acetone |
| 48 | 0.725 | 0.90 |
| 72 | 0.745 | 1.04 |
| 96 | 0.703 | 1.05 |

Without being limited to any theory, the use of acetone or DMSO is believed to improve the "fluidity" of the reaction mixture allowing efficient mixing by rotation or shaking. Extra 0.3M NaOH (2 mL per 8 g or Perloza) was required for similar mixing of 100% aqueous samples. A 48 hour activation by this method with 15% allyl glycidyl ether resulted in an activation level of 0.113 mMoles/g. Stock allyl glycidyl ether (27%) was prepared by this aqueous slurry method, using 15% allyl glycidyl ether followed by a second activation step with 12% allyl glycidyl ether. The activation level was 0.153 mMoles/g.

Example 3

Titration Methods

The extent of allyl incorporation on the matrix was initially quantified using 2% bromine water titration and subsequently a mercaptoacid titration of the allyl groups was developed.

A. Bromine Water Titration of Matrix Allyl Groups

Bromine water titration was by incremental addition (using 100 µL, 200 µL, or 1 mL Gilson pipettes) of calibrated (approximately 2%) bromine water to a 0.5–2 g sample of activated matrix. The smallest increments (50 µL) were used once the rate of bromine decolorization had slowed noticeably, usually after 60–75% of the total addition. The endpoint was determined visually. Titration was usually complete in 2–5 minutes.

Bromine Water was Calibrated by Two Methods:

(I) Bromine water of 1.5–2.5% was prepared as accurately as possible by weighing bromine (1.5–2.5 g) into a (100 mL) volumetric flask and (rapidly) making the volume up to 100 mL with water. The molarity of the bromine water was calculated assuming that the initial $Br_2$ concentration was maintained (no vapor loss) at the time of titration.

(II) Bromine water of similar concentration range to the previous method was prepared as a stock solution and assayed immediately before use. Bromine water (0.5 mL) was diluted with water to 25 mL and its absorbance measured at 410 nm. Bromine content was calculated by comparison with the values of standards, freshly prepared by method I.

A series of dilutions of a stock 2% bromine water solution (1:99, 2:98, 3:97, 4:96 and 5:95) had absorbances of 0.154, 0.327, 0.500, 0.698 and 0.910 respectively. A reasonably linear increase in absorbance was found, up to 0.5. Therefore measurements were confined to this range using the appropriate dilution. The absorbance of freshly prepared bromine water at 410 nm was 0.117 for a 0.014% solution and 0.305 for a 0.036% solution. These values equated to: absorbance (×dilution)×0.12=bromine water %. This conversion was used for subsequent "quantitative bromination titration". Bromine water quantification was improved by using the spectrophotometric assay of the bromine water immediately before titration. This bromine water titration was still less than ideal for a routine laboratory assay because of accuracy limitations and noxious fumes associated with use of bromine water.

B. Mercaptoacid Titration of Allyl Groups

Activated matrix (1 g) was mixed with 100 µL of mercaptoacetic acid (MAA) or mercaptopropionic acid (MPA) and 1–5 mL water. The mixture was incubated for 4–16 hours at 60° C. or for 24–48 hours at room temperature (MAA only). Samples were transferred to a sintered glass funnel and excess reagent washed out with 20 mL water, 20 mL 0.1M NaOH and 10×20 mL water. Titration of carboxylic acid groups provided the level of allyl incorporation onto the matrix.

Allyl group quantification via these different methods is illustrated in Table 1 above.

In examples 7 and 10 below, all samples were "back-titrated" by the mercaptoacetic acid method. Pre- and post-addition samples were titrated with mercaptoacetic acid. The addition level was determined by difference (pre-addition mercaptoacetic acid titration - post-addition titration).

In the examples below, allyl Perloza and allyl glycidyl ether Perloza refer to water solvated, suction-dried Perloza unless otherwise indicated.

Examples 4–10 demonstrate facile attachment of a wide range of thiols and bisulfite ions to allyl matrices by specific free radical addition thereby permitting a wide range of different ligands to be attached to these matrices which, in turn, allows for facile target compound separation. Additionally, in contrast to prior art methods, specificity of the free radical addition was demonstrated by the absence of reaction with an amine (ethanolamine) under these conditions.

Example 4

Mercaptopropionic and Mercaptoacetic Acid Addition Methods to the Allyl Groups Initial addition of mercaptopropionic acid to allyl Perloza (prepared as above) used 75 µL/g wet matrix and included 2.5 mg ammonium persulfate. Subsequent additions used 100 µL/g. Reaction was for 3–4 hours at 60° C. Variations were room temperature reaction for 16 hours, inclusion of 4-methoxyphenol (20 mg) and exclusion of ammonium persulfate. Reaction at 60° C. for at least 4 hours, without ammonium persulfate, was the standard method adopted. Water (1–5 mL) was included to ensure adequate mixing.

The same reagent proportions and reaction conditions were standard for mercaptoacetic acid addition. Variations tested were reagent proportion (30 and 60 µL/g), room temperature (24 or 48 hours) and pH adjustment to 6.

Unmodified Perloza was also reacted with mercaptopropionic acid and mercaptoacetic acid by this method and served as a control.

Results

Reaction of mercaptopropionic acid (100 µL) with 30% allyl glycidyl ether Perloza (1 g) at 60° C. for 4 hours with catalytic ammonium persulfate (2 g), resulted in an addition level of 0.198 mMoles/g. The same allyl glycidyl ether activated Perloza, reacted with bromine water followed by substitution with sodium sulfite, gave a titration of 0.177 mMoles/g. Addition at 60° C. was similarly effective without ammonium persulfate (0.186 mMoles/g) but was largely inhibited by 20 mg of 4-methoxyphenol (0.044 mMoles/g). A 16 hour addition at room temperature resulted in an intermediate titration value (0.136 mMoles/g). No attempt was made to exclude oxygen from the reaction mixture and it was assumed that light, dissolved oxygen and/or trace amounts of peroxides effectively initiated the reaction, without requirement of any extra catalyst. Therefore peroxide catalysts were not used for subsequent mercaptoacid additions. The inhibitory effect of 4-methoxyphenol was indicative of the anticipated free radical mechanism. These results are summarized in Table 7.

In Table 7, allyl glycidyl ether (30%) Perloza was used except for the control sample (Perloza+MPA). MPA was the ligand used, unless otherwise stated. The free radical inhibitor used was methoxyphenol. Efficiency was calculated by correction for the control titration value and comparison to the "possible" addition level found with MAA (reacted at 60° C. for 4 hours, no catalyst).

TABLE 7

Temperature, catalyst and inhibitor effects on mercaptoacid addition

| Reaction sample (%) | Titration (mMoles/g) | Efficiency |
|---|---|---|
| control | 0.004 | n.a |
| 60° C. + catalyst (APS) | 0.198 | 97 |
| 60° C. | 0.186 | 91 |
| 60° C. + inhibitor | 0.044 | 20 |
| room temperature + APS | 0.136 | 66 |
| MAA, 60° C. | 0.204 | 100 |

Mercaptopropionic acid or mercaptoacetic acid addition (60° C.) to unmodified Perloza gave a titration of 0.004 mMoles/g, demonstrating the requirement of allyl groups for reaction. The small titration obtained could be explained by a combination of impurities, dilution effects, charged groups on the original Perloza and trace amounts of aldehyde on the matrix which could undergo nucleophilic addition of the thiol (McMurray[18]). Titration of unmodified Perloza gave a similar value (0.005 mMoles/g), which suggested that the small level of charged groups was not due to reaction of unmodified Perloza with mercaptopropionic acid.

A 5 molar excess or greater was considered preferable for quantitative mercaptoacetic acid addition, and room temperature was sufficient for complete reaction.

Addition (at 60° C.) of mercaptoacetic acid was also demonstrated, using 30% allyl glycidyl ether Perloza. The titration of 0.204 mMoles/g was even higher than achieved with mercaptopropionic acid, suggesting superior reactivity and/or more complete titration by pH 8. Titration shows that in 1M NaCl the pKa of mercaptoacetic acid Perloza was significantly lower than that of mercaptopropionic acid Perloza (3.9 compared to 4.9). However, neither resin titrated significantly above pH 7. Superior reactivity was therefore assumed and mercaptoacetic acid replaced mercaptopropionic acid addition for allyl group titration.

Equivalent levels of addition to an allyl glycidyl ether Perloza sample were found for a 48 hour reaction at room temperature and a reaction at 60° C. for 4 hours (both 0.135 mMoles/g). The addition level to another allyl glycidyl ether matrix was 0.191 mMoles/g after 24 hours at room temperature (compared to 0.194 mMoles/g at 60° C.). The standard amount of mercaptoacetic acid used was 100 µL/g allyl Perloza. This represented a 5 molar excess or greater over allyl groups for activated matrices of 0.28 mMoles/g or less. Addition of lower amounts to the more highly activated allyl glycidyl ether matrix resulted in titrations of 0.119 mMoles/g (2 molar excess of mercaptoacetic acid) and 0.184 mMoles/g (4 molar excess). These levels equated to 61 and 95% of the standard titration respectively. Therefore a 5 molar excess or greater was considered preferable for quantitative mercaptoacetic acid addition, and room temperature was sufficient for complete reaction.

Example 5

Mercaptosuccinic Acid Addition Methods to the Allyl Groups

By following the procedures set forth above, mercaptosuccinic acid was reacted with allyl Perloza (prepared as above) and water (1:1) for 16 hours at 60° C. or for 64 hours at room temperature. Mercaptosuccinic acid (0.15 g/g matrix) was dissolved in the reaction mixture.

Addition of mercaptosuccinic acid (0.15 g) to an allyl glycidyl ether matrix (0.134 mMoles/g, 1 g) resulted in a titration of 0.189 meq/g to pH 10. Because mercaptosuccinic acid has two carboxyl groups this was equivalent to 0.095 mMoles/g. The mercaptosuccinic acid resin was titrated to a higher pH than the mercaptoacetic acid resin because it appeared that titration was still occurring at pH 8. Dilution effects were insignificant for the pH 10 endpoint. The apparent addition level of mercaptosuccinic acid was approximately 70% of the possible (mercaptoacetic acid level).

The efficiency of mercaptosuccinic acid addition was improved by reaction at room temperature for 60 hours. Stock 7% allyl bromide activated Perloza (mercaptoacetic acid titration of 0.174/g) was used. The titration value for mercaptosuccinic acid was 0.313 meq/g (0.157 mMoles/g, 90%) to pH 8. Although the thiol group of mercaptosuccinic acid is secondary (steric restriction more likely), a very high addition level was thus obtained. In contrast to earlier results, the titration value was not found to increase significantly above pH 8 (0.317 meq/g to pH 9). The mercaptosuccinic acid derivative could be used for ion exchange chromatography. Specific ionic interactions may occur with the dicarboxylic acid moiety.

Example 6

Additions of Other Mercapto Acids to the Allyl Groups

By following the procedures set forth above with the modifications described below, the glutathione, merpatobutyric acid, thiosalicylic acid and mercaptohexanoic acid were coupled to allyl Perloza prepared as described above.

Specifically, glutathione (free acid form) was reacted under the same conditions, but 0.2 g/g matrix was used. Glutathione was also reacted (at 60° C.) with Perloza, using 0.2M $H_3PO_4$ instead of water.

Mercaptohexanoic acid (0.2 mL), mercaptobutyric acid (0.5 g) and thiosalicylic acid (0.2 mL) were reacted with allyl Perloza (1 g) for 48 hours at 60° C. Ethanol (1 mL) was included to facilitate dissolution of the ligands.

Significant addition of glutathione (0.2 g) to an allyl glycidyl ether matrix (1 g, 0.134 mMoles/g) was also effected by reaction for 16 hours at 60° C. The titration of 0.115 mMoles/g (up) to pH 7 indicated that although addition occurred it was less efficient than mercaptopropionic acid or mercaptoacetic acid addition. However, the molar excess of glutathione used was lower than for the other thiols.

Addition of glutathione to another allyl glycidyl ether matrix resulted in a titration of 0.098 mMoles/g to pH 8 and 0.203 mMoles/g to pH 11 (mercaptoacetic acid titration 0.135 mMoles/g). This glutathione resin was prepared by addition of the reduced free acid form of glutathione. Addition of glutathione in dilute phosphoric acid resulted in a much lower titration value (0.046 mMoles/g to pH 11). For glutathione resins it was assumed that titration to pH 7 would represent one carboxyl group per glutathione immobilized. Titration to pH 11 would also include the amino group of glutathione. This presumed that the second carboxyl group of glutathione would be associated with the amino group in the carboxylate ion form at the start of titration. Allowing for dilution effects (a blank titration to pH 11 was 0.017 mMoles/g), when titrating between pH 10 and 11, an addition level of 0.093 mMoles/g (70% of mercaptoacetic acid) was calculated.

The efficiency of glutathione addition was improved by reaction at room temperature for 60 hours. Stock 7% allyl bromide activated Perloza (mercaptoacetic acid titration of 0. 174/g) was used. The titration for the glutathione resin was 0.136 and 0.300 meq/g to pH 7 and 11 respectively. The addition level was calculated to be 0.142 mMoles/g (82%) after subtraction of the blank titration value. The high efficiency of glutathione addition at room temperature suggested that this method could be used for immobilization of other thiol containing peptides and possibly proteins, without requiring elevated temperature. Free radical addition of glutathione represents a very simple method for production of glutathione affinity resins. Unreacted allyl groups are readily blocked using mercaptoethanol.

The addition level of glutathione might also be increased if a higher molar excess (than 3) were used.

No evidence of addition of thiosalicylic acid (0.2 mL/g allyl Perloza) was obtained after a 48 hour reaction at 60° C. (titration of 0.002 mMoles/g). Addition of mercaptobutyric acid (0.5 g) and especially mercaptohexanoic acid (0.2 mL) was less efficient than that of mercaptopropionic acid and mercaptoacetic acid, despite a 96 hour reaction at 60° C. The titration values were 0.131 and 0.026 mMoles/g respectively (MMA titration was 0.180 mMoles/g for the same resin).

To the extent a thiol ligand does not add to ethylenic unsaturation exemplified by an allyl group, it is not a reactive thiol ligand for the purposes of this invention.

Data for Examples 5 and 6 are set forth in Table 8 below:

TABLE 8

| Efficiency of MSA and glutathione addition compared to MAA | | |
|---|---|---|
| Thiol ligand | Titration (mMoles/g) | Efficiency (%) |
| MAA | 0.174 | 100 |
| MSA | 0.157 | 90 |
| GSH | 0.142 | 82 |

The slightly lower level of addition of glutathione and mercaptosuccinic acid as compared to mercaptoacetic acid might be due to inhibition by the amine group (GSH), greater ionization of the diacidic ligands (compared to mercaptoacetic acid), steric effects or simply poorer reactivity. The addition level of glutathione might also be increased if a higher molar excess (than 3) were used.

Example 7

Mercaptoethanol and Dithiothreitol Addition Methods to the Allyl Groups

By following the procedures set forth above, mercaptoethanol and dithiothreitol were coupled to allyl Perloza prepared as described above.

Specifically, addition of mercaptoethanol (100 µL) was at 60° C. (16 hours) or room temperature (24 or 48 hours).

Dithiothreitol addition was conducted by mixing allyl Perloza (2 g, 0.16 mMoles/g) with a 4 molar excess (0.17 g) of dithiothreitol for 48 hours at room temperature.

The mercaptoacetic acid back titration result for dithiothreitol addition was 0.062 mMoles/g which corresponds to approximately 0.1 mMoles/g of dithiothreitol attached to the resin.

Addition of 2-mercaptoethanol (100 µL) to allyl glycidyl ether activated Perloza (1 g) (mercaptoacetic acid titration of 0.144 mMoles/g) at 60° C. (16 hours) was apparently quantitative. 2-Mercaptoethanol addition to another allyl glycidyl ether Perloza (mercaptoacetic acid titration of 0.191 mMoles/g; 1.35 mMoles/g dry) at room temperature (24 hours) was equally effective, indicating complete reaction of allyl groups (with mercaptoethanol). The "back" titration of both resins, with mercaptoacetic acid, was 0.001 mMoles/g. Elemental sulfur analysis of the latter sample gave 4.45% (1.39 mMoles/g dry), consistent with the figure obtained by titration for the mercaptoacetic acid derivative 2-mercaptoethanol addition at room temperature would thus represent a simple and effective method for blocking unreacted allyl groups, following addition of another ligand (providing the other ligand groups do not cause steric restriction).

Example 8

Bisulfite Addition Methods to the Allyl Groups

Initial reactions were as above and employed 0.1 g each of sodium sulfite and sodium metabisulfite and 5–10 ml, water per g allyl Perloza. Reactions were at room temperature or 60° C. and for 4 to 48 hours, as indicated.

Alternatively, 0.2 g of sodium metabisulfite was used, and the pH of the reaction mixture adjusted to 5 or 5.5 with 1M NaOH. For the latter reaction, 1 mL of 4M acetate buffer, pH 5.5, was included. The samples at pH 5.5 were reacted for 48 hours and one sample was readjusted to pH 6 after 24 hours of the reaction.

In another embodiment, a 5 molar excess (each) of sodium metabisulfite and sodium sulfite, adjusted to pH 7 with NaOH was used and the pH maintained with excess 4M acetate buffer. A final pH variation used a 10 molar excess of sodium sulfite, adjusted to pH 8 with HCl, was used without extra buffer.

Alternatively, the addition reaction can be modified by using a smaller reaction volume. For example, solutions containing equal parts (by weight) of sodium metabisulfite and sodium sulfite were used. Initially, the total sulfite plus bisulfite salt percentage was 32% and 1 mL of "bisulfite" solution was used per g matrix. Later reactions used a 40% sulfite solution (0.7–1.0 mL/g matrix). Up to half of this solution (0.2–0.5 mL/g) was used to prewash the matrix, which was then suction-dried, while the other 0.5 mL/g was used for the reaction mixture. All larger scale reactions (20–250 g allyl Perloza) were carried out by this method. It was also used for a control reaction with unmodified Perloza.

Results

Initial experiments used a 1:1:10 ratio by weight of sodium sulfite, sodium metabisulfite and allyl cellulose and results indicated that addition (24 hours at room temperature) occurred readily. Although addition of a peroxide catalyst was not required it was presumed that the free radical mechanism of addition was responsible and that dissolved oxygen or trace amounts of peroxide acted as initiators (Kharasch et al.[10]). The reactive species was reported to be bisulfite and the preferred range for bisulfite addition to be pH 5–6 by Kharasch et al.[10]. However, using unbuffered bisulfite at pH 5, the pH dropped during the reaction and low addition yields were obtained. The pH drop was presumably due to oxidation of bisulfite to the more acidic bisulfate ion. Reaction at elevated (60° C.) temperatures gave a low addition (0.031 mMoles/g for a 30% allyl glycidyl ether matrix, mercaptoacetic acid titration 0.204 mMoles/g) and addition results at room temperature were little better (0.037 mMoles/g).

A 48 hour, room temperature addition of bisulfite (adjusted to pH 5.5) to allyl glycidyl ether Perloza resulted in a much higher yield (0.139 mMoles/g). An equivalent addition, adjusted up to pH 6 after 24 hours, had a titration of 0.192 mMoles/g (1.30/g dry). The comparable values for mercaptoacetic acid were 0.204 mMoles/g (1.31/g dry). This indicated nearly quantitative reaction of allyl groups. Therefore sodium sulfite or acetate was used for subsequent additions to buffer the reaction above pH 5. Little reaction occurred when sodium sulfite, buffered at pH 8, was mixed with another allyl glycidyl ether Perloza sample. The titration was 0.018 mMoles/g compared to 0.206 mMoles/g by mercaptoacetic acid titration). Addition occurred more readily at pH 7 but was low (titration of 0.074/g). The effect of initial pH on bisulfite addition to allyl Perloza is depicted in FIG. 4 below.

Figure 4:
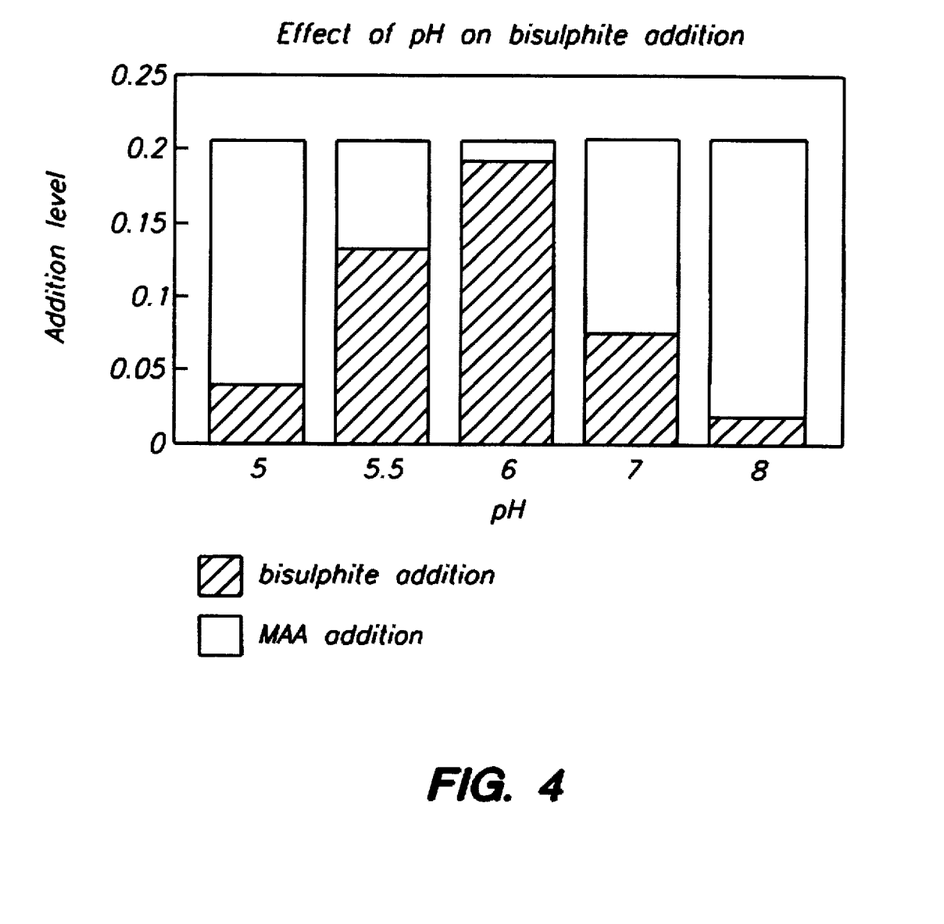
FIG. 4 illustrates the effect of pH on bisulphite addition.

In FIG. 4, the pH 6 example was initially reacted at pH 5.5 for 24 hours, followed by pH adjustment to 6 and a further 24 hour reaction. All other samples were reacted for 48 hours without pH adjustment. Allyl glycidyl ether Perloza (mercaptoacetic acid titration of 0.204 mMoles/g) was used for additions at pH 5–6. Allyl glycidyl ether Perloza (mercaptoacetic acid titration of 0.206 mMoles/g) was used for addition at pH 7 and 8.

The preceding experiments concentrated on pH effects and reaction volumes were variable. The same approach with allyl bromide activated Perloza gave significantly lower results than those obtained by mercaptopropionic acid addition or bromination and sulfite substitution. The titration values after bisulfite addition to the 7 and 24 hour DMSO samples of Table 3 were 0.067 and 0.142 mMoles/g. The corresponding mercaptopropionic acid titration values were significantly higher (0.145 and 0.202 mMoles/g).

High sulfite addition levels were thus obtained by reaction of allyl Perloza (1 g) with 1 mL of bisulfite reagent (containing 0.16 g each of sodium metabisulfite and bisulfite). Titration values of 0.160, 0.161 and 0.213 mMoles/g were obtained for stock allyl glycidyl ether, 7% allyl glycidyl ether and 10% allyl bromide Perloza, compared to 0.153, 0.180, 0.252 for mercaptoacetic acid addition. The addition level on allyl bromide activated Perloza was still lower than for mercaptoacetic acid, but was a significant improvement over earlier results. Using a bisulfite solution containing 2 g each of sodium sulfite and sodium metabisulfite per 10 mL, addition to allyl bromide Perloza was improved, but scale-up to a 20g (Perloza) reaction gave a poorer addition to 10% allyl bromide Perloza (0.196 mMoles/g). Therefore the effect of time, heat, and catalysts on addition to this 10% allyl bromide Perloza were compared. Elevated temperature (60° C.) gave a much lower addition level (0.070 mMoles/g). Without being limited to any theory, these results might be due to a greater rate of sulfite oxidation compared to addition at elevated temperature. Inclusion of catalysts (bubbled air or hydrogen peroxide) provided no advantage. There was a small increase between 24 and 48 hours for room temperature addition. A resin with a lower titration value (air catalyzed, 0.200 mMoles/g) was reacted again with bisulfite and the titration value increased to 0.218 mMoles/g. Likewise repeat addition of bisulfite to the 20 g (10% allyl bromide) Perloza described before resulted in a titration of 0.216 mMoles/g. This repeat addition involved preparation of 1 mL bisulfite solution per g resin, half of which was used to presolvate the resin (displacing water), which was then suction-dried. The remaining half of the bisulfite solution was mixed with the suction-dried resin for 48 hours. This procedure results in a lower reaction volume and higher reagent concentration and was adopted for subsequent bisulfite addition reactions. These bisulfite addition results are summarized in Table 10.

TABLE 10

Optimization of sodium bisulfite addition

| Chemistry | Ligand | Titration (mMoles) | Dry weight (g dry) | Substitution (mMoles/g dry) |
|---|---|---|---|---|
| AB 10% | 32% bisulfite | 0.213 | 0.141 | 1.52 |
| AB 7% | | 0.151 | 0.128 | 1.26 |
| AGE | | 0.160 | 0.133 | 1.21 |
| AB 10%, 60° C. | 40% bisulfite | 0.070 | n.d. | n.d. |
| AB 10%, air | | 0.200 | n.d. | n.d. |
| AB 10%, $H_2O_2$ | | 0.197 | n.d. | n.d. |
| AB 10%, 24 hr | | 0.195 | 0.138 | 1.42 |
| AB 10%, 48 hr | | 0.212 | 0.142 | 1.50 |
| AB 10%, 20 g | | 0.216 | 0.136 | 1.59 |
| AB 7%, 20 g | | 0.179 | 0.140 | 1.28 |
| AB 7.5%, 200 g | | 0.204 | 0.141 | 1.44 |

At high allyl bromide activation levels, bisulfite cannot match mercaptoacetic acid addition. Nevertheless 85–90% of the possible level has been obtained and the reaction is no longer prone to significant variation. Again, without being limited to any theory, a probable cause of the drop in performance at high activation levels is charge shielding. Whereas the addition species and resin product are uncharged for mercaptoacetic acid, both bisulfite and the sulfonate resin product are negatively charged. Therefore electrostatic repulsion may restrict access to a small proportion of allyl groups. This restricted population would be expected to increase with increasing total allyl group density. Reaction of a stock 7% allyl bromide Perloza with bisulfite produced a titration value of 1.25 mMoles/g dry compared to 1.36 mMoles/g dry for mercaptoacetic acid addition. However, the difference could not be made up by addition of mercaptoacetic acid to the sulfonate resin, either in the protonated or $Na^+$ form (both 1.25 mMoles/g dry). Without being limited to any theory, this suggested that sulfonate groups restrict access to some allyl groups, irrespective of the nature of the addition reagent. Allyl groups were not, however, detected by bromine water titration, but the possible allyl group level was considered too low to be readily and reliably detected by this method, because of the slow level of spontaneous decolorization. However access of bromine to unreacted groups might also be restricted. Mercaptoethanol might be used to try to block unreacted groups but this may have little effect since MAA did not appear to react with a sulfonate resin. If residual groups do not react with bisulfite or small thiols, they are not expected to be able to interact with macromolecules and thus effect protein chromatography.

Example 9

Cysteine, Cysteamine and MEP Addition Methods to the Allyl Groups

The first addition reactions used unbuffered cysteine hydrochloride. Reaction was for 16 hours at 60° C. using allyl glycidyl ether activated Perloza (1 g), 0.08 g cysteine-.HCl and 5 mL water. Subsequently, cysteine (5 molar excess, +/–50 μL formic acid) was used rather than its hydrochloride. Trichloroacetic acid, oxalic acid or acetic acid were also used instead of formic acid (1 mole/mole of cysteine). Acetic and formic acids were also used in larger amounts (5 or 10 molar equivalents). Cysteamine and 4-mercaptoethylpyridine hydrochlorides (5 molar excess) were neutralized with a 1 molar equivalent of (7.5M) NaOH and reacidified with a 2–5 molar excess of an organic acid. For initial addition reactions, acetic acid was used and the solutions were reacted with allyl glycidyl ether Perloza for 16 hours at 60° C. These are referred to as cysteamine/ acetate and 4-mercaptoethylpyridine/acetate addition mixtures. Formic acid was used for subsequent additions (cysteamine/formate and 4-mercaptoethylpyridine/formate mixtures).

The initial addition of cysteamine/formate (5 molar excess) to stock 7% allyl bromide activated Perloza was for 48 hours at 60° C. +/–ammonium persulfate (2.5 mg) or benzoyl peroxide (3.6 mg). A further (uncatalysed) sample was reacted for 96 hours at 60° C. Similar additions (to stock 10% allyl bromide Perloza) were carried out for 24, 48, 96 and 144 hours at 70 to 75° C., using a 10 molar excess of cysteamine/formate. Allyl Perloza (6% allyl bromide stock) was reacted likewise with cysteamine/formate. A control sample of 10% stock allyl bromide Perloza and cysteamine.HCl was also reacted for 144 hours at 70° C. The same temperature was used for addition (96 hours) of a 10 molar excess of cysteine/formic acid to stock 10% allyl bromide Perloza (1.7 g). Control reactions (96 hours, 60° C.) with allyl Perloza used ethanolamine (+/–1 molar equivalent of formic acid). A control reaction was also carried out using unmodified Perloza and cysteamine/formate.

In addition to the above reactions conducted at 60°–70° C., addition of MEP, cysteine and cysteamine have also been conducted using a "heat" lamp (Tungsram 250 Watt, infrasatin IR 2) which is not the ideal catalyst for free radical reactions (in terms of wavelength) and is therefore considered as mild catalysis. Specifically, mercaptoethylpyridine (MEP) hydrochloride (MEP, 0.52 g) was dissolved in 0.5 mL water and mixed with 0.3 mL 10M NaOH and 0.6 mL glacial acetic acid. The MEP acetate solution was mixed with 3 g allyl Perloza (0.203 mMoles/g; 1.45 mMoles/g dry) in a 30 mL beaker, sealed with plastic wrap and irradiated (lamp at 15–20 cm from the top of the beaker) for 3 hours. Some warming of the reaction mixture occurred but it was estimated to be only to between 30° and 40° C. The resulting resin had a pyridyl titration level of 0.24 mMoles/g (1.36 mMoles/g dry).

Results

Addition of cysteine.HCl (0.08 g) to an allyl glycidyl ether Perloza matrix (1 g) was limited (0.013 mMoles/g, mercaptoacetic acid titration of 0.134 mMoles/g), using conditions (16 hours, 60° C.) which were effective for the thiols described before. An even lower additional level was found for cysteamine.HCl (0.006 mMoles/g) (a 5 molar excess, 0.12 g), on another allyl glycidyl ether Perloza sample (1 g) (mercaptoacetic acid titration of 0.204 mMoles/ g). Because addition of glutathione was limited in the presence of phosphoric acid, cysteine.HCl was replaced by cysteine (a 5 molar excess, 0.1 g), used with or without a one molar excess of formic acid. The addition in the presence of formic acid was more successful (0.063 compared to 0.012 mMoles/g). Cysteamine/formic acid addition resulted in a titration of 0.035 mMoles/g on another allyl glycidyl ether matrix (0.082 mMoles/g by mercaptoacetic acid titration). Formic acid was replaced by acetic acid without a significant change (0.033 mMoles/g) but TCA and oxalic acid were less effective (0.025 and 0.007 mMoles/g). These results might indicate an effect of acid strength because the latter two are stronger acids (than formic and acetic). Oxalic acid decomposition in water and its second carboxyl group might have negative effects on the reaction. Little difference resulted from use of a 1 or 10 molar excess of formic or acetic acid (range of 0.033 to 0.035 mMoles/g). A repeat addition at 60° C. increased the titration level to 0.055 mMoles/g, whereas addition at room temperature gave no increase in titration. Similar results were obtained (single addition) using cysteamine/acetate (titration of 0.032 mMoles/g) and 4-mercaptoethylpyridine/acetate (0.043 mMoles/g).

Reaction of cysteamine/formate with allyl bromide Perloza (0.180 mMoles/g mercaptoacetic acid titration) for 48 hours at 60° C. gave higher results but these were not increased by inclusion of ammonium persulfate or benzoyl peroxide (Table 11). The titration of an uncatalysed sample reacted for 96 hours at the same temperature was 0.103 mMoles/g. A limit to addition (0.128 mMoles/g) was found on a highly activated allyl bromide Perloza (mercaptoacetic acid titration, 0.249 mMoles/g) after a prolonged (96 hour) reaction with cysteamine/formate at 70° C. Other titrations were 0.054, 0.098 and 0.129 mMoles/g after 24, 48 and 144 hours respectively. Little increase was found when the reaction was repeated with fresh cysteamine/formate (0.135 mMoles/g). However this addition level might be improved by use of smaller reaction volumes. Use of cysteamine.HCl (no formic acid) gave a much lower result. Addition of cysteine (10 molar excess)/formic acid at 70° C. gave a similar result (0.114 mMoles/g) to that with cysteamine. Addition of cysteamine/formic acid to a lower substituted allyl bromide resin (0.139 mMoles/g mercaptoacetic acid titration) gave a titration of 0.110 mMoles/g (79% efficiency). These results are summarized in Table 11.

In Table 11, cysteamine refers to cysteamine/formate mixtures except for one sample using cysteamine.HCl. Stock 7% allyl bromide Perloza was used for cysteamine additions at 60° C., stock 10% allyl bromide Perloza for addition at 70° C. unless otherwise indicated.

TABLE 11

Addition levels for cysteamine and cysteine on allyl Perloza

| Ligand | Temp. (°C.) | time (h) | titration (mMoles/g) |
| --- | --- | --- | --- |
| Cysteamine | 60 | 48 | 0.063 |
| Cysteamine/APS | 60 | 48 | 0.063 |

TABLE 11-continued

Addition levels for cysteamine and cysteine on allyl Perloza

| Ligand | Temp. (°C.) | time (h) | titration (mMoles/g) |
|---|---|---|---|
| Cysteamine/BP | 60 | 48 | 0.050 |
| Cysteamine | 60 | 96 | 0.103 |
| Cysteamine | 70 | 24 | 0.054 |
| Cysteamine | 70 | 48 | 0.098 |
| Cysteamine | 70 | 96 | 0.128 |
| Cysteamine | 70 | 144 | 0.129 |
| Cysteamine.HCl | 70 | 144 | 0.027 |
| Cysteamine/formate | 70 | 144 | 0.114 |
| Cysteamine (6% AB) | 70 | 144 | 0.112 |

Although addition of cysteine and cysteamine occurred, their reactivity was much poorer than another amine containing ligand, glutathione. Without being limited to any theory, it is noted that glutathione has a surplus of acidic over amine groups (solutions used had a pH of 2) and the nitrogen most adjacent to the thiol group is part of a neutral amide bond.

A similar experiment was carried out using cysteamine-.HCl instead of MEP. The amine titration level was 0.134 mMoles/g (1.04 mMoles/g dry). Similar reaction of MEP hydrochloride without NaOH/acetic acid gave no addition. The pH of the solution without acetate buffer is below 2. No addition was found for thiols directly attached to the aromatic ring (mercaptobenzimidazole and 4-mercaptopyridine) or for propyl mercaptan, using the acetate buffered "irradiation" method. Cysteine (0.12 g) mixed with water (1 mL) and formic acid (0.2 mL) addition to allyl Perloza (0.054 mMoles/g, 4 g) was successful by this method. The titrated addition level was 0.053 mMoles/g (after correction for a blank titration to pH 11.

Although reaction of formic acid with double bonds has been documented (Knight et al.,[19]) there is no doubt from the observed titration that amine groups have been attached to Perloza. No evidence of reaction was found between allyl Perloza and amine groups, using ethanolamine +/−formic acid (60° C., 96 hours), or between cysteamine/formate and unmodified Perloza. The titration values were all 0.001 mMoles/g and the starting pH varied between 4.88 and 4.96. The corresponding titration for cysteamine/formate addition to allyl Perloza, was 0.080 mMoles/g and the starting pH 10.20. Both ligand thiol groups and matrix allyl groups were necessary for addition. Free radical addition of an amine to allyl groups was not expected (Cadogan and Perkins[20]) and the results with ethanolamine supported this. The effect of formic acid/acetic acid may be catalytic or due to "masking" of amine groups.

Simple methods of catalysis were used for these experiments, with no attempt to exclude oxygen. Under these conditions no advantage has been observed for use of chemical catalysts. Reaction temperatures above 70° C. may improve reaction yields. It is contemplated that superior results may be obtained by use of more suitable radiation catalysis. Although these reactions were much less efficient than those of mercaptoethanol and the mercaptoacids they may be economically viable especially with superior catalytic techniques. The specificity of reaction through the thiol group is an advantage over conventional methods of thiol attachment.

Example 10

Thiolacetic Acid and Thiophenol Addition Methods to the Allyl Groups

Allyl glycidyl ether activated Perloza was reacted with thiolacetic acid (100 μL) and 5 mL water for 24 hours at room temperature or 16 hours at 60° C. Another room temperature reaction used ethanol solvation rather than water. The allyl glycidyl ether activated Perloza was washed with 5 volumes each of 50% and 100% ethanol, suction-dried, and mixed with thiolacetic acid and 5 mL of ethanol. Water solvated allyl bromide Perloza (7% stock) was used for addition of thiolacetic acid (0.2 mL), together with 2 mL each of water and ethanol, for 90 hours at room temperature.

Thiophenol (0.2 mL) was mixed with 7% stock allyl bromide Perloza (1 g), 2 mL water and 3 mL acetone or ethanol, for 90 hours at room temperature.

Thiolacetate resins were washed with 20 volumes of water. Thiophenol resins were washed with 10 volumes each of ethanol, 0.1M NaOH and water. Unreacted allyl groups were determined by mercaptoacetic acid "back" titration.
Results Results with thiolacetic acid (100 μL) indicated that some reaction occurred but was well short of completion. Analysis was by "back" titration with mercaptoacetic acid, which may hydrolyze the thiol ester and/or oxidize thiol group. The back titrations of aqueous reaction samples were 0.105 (60° C.) and 0.112 (room temperature) mMoles/g, compared to the original mercaptoacetic acid titration of 0.135 mMoles/g. This was equivalent to 0.029 and 0.023 mMoles/g of thiolacetate groups. A similar result was obtained for addition with an ethanol/water mixture (0.023 mMoles/g of thioacetate). No advantage was obtained using 100% ethanol solvation. These low addition levels might be due to the high acidity of thioacetic acid (the pH of a 1% solution was 1.95), which could be countered by solvent use. Stronger catalytic measures may be required.

Addition of thiophenol to 7% allyl Perloza apparently occurred, although it was only 20–25 % of the possible (MAA) level. The back titrations were 0.137 and 0.128 mMoles/g for acetone and ethanol solvated samples respectively. The original mercaptoacetic acid titration was 0.174 mMoles/g, therefore the thiophenol addition levels were 0.037 and 0.046 mMoles/g. Additionally, it is possible that the use of ultraviolet irradiation and similar methods may enhance the addition efficiency of thiophenol to allyl Perloza.

Example 11

Affinity Chromatography Using Resins Containing Thiol Ligands

Mercaptoacetic acid Perloza (0.054 mMoles/g, 3 g), prepared by mercaptoacetic acid addition to 2% allyl Perloza (prepared as above from allyl bromide), was reacted with ethyldimethylaminopropylcarbodiimide (EDC, 0.15 g), p-aminobenzamidine dihydrochloride (0.15 g) and pH adjusted to 4.7 for 24 hours (pH controlled for first 2 hours). Fresh EDC (0.1 g) was added and the reaction repeated. This resin was used for affinity chromatography of crude trypsin (type II, Sigma Chemical Co.) as per Hixson et al., Arch. Biochem. Biophys., 154:501–509 (1973). Typical strong adsorption was found at pH 8.2 (+/−0.5M NaCl) and elution at pH 2.5 (50 mM formic acid). Significant purification was obtained, as determined by removal of material absorbing at 280 nm in load and high ionic strength washes and electrophoretic purity (equivalent to type IX trypsin).

Example 12

Chromatography Using Resins Containing Thiol Ligands

Mercaptoethylpyridine (MEP) Perloza, prepared as above, (with a normal pyridyl titration curve, start pH of 6.8)

was used according to the method of Burton et al.[1] for adsorption of crude subtilisin and amylase and elution by a pH change. Both enzymes were loaded at pH 7.5 (20 mM HEPES+0.5M NaCl) and eluted at pH 5.2 (20 mM acetate). Chromatographic properties were indistinguishable from those of MEP resins produced by allyl activation, bromination and nucleophilic substitution.

Although the foregoing invention has been described in some detail by way of illustration and example for purposes of clarity and understanding, it will be apparent that certain changes and modifications may be practiced within the scope of the appended claims.

What is claimed is:

1. A method for preparing chromatographic resins comprising a support matrix having ligands capable of binding a target compound covalently attached thereto through a linking group comprising sulfide, sulfoxide, or sulfone functionality which method comprises:
   (a) providing a support matrix comprising ethylenically unsaturated functionality appended thereto;
   (b) contacting the matrix of (a) above with a reactive thiol compound of the formula R—SH under free radical conditions sufficient to provide for covalent —SR linkage to said matrix wherein R is a ligand capable of binding a target compound; and
   (c) optionally oxidizing said sulfide linkage to a sulfoxide or sulfone.

2. The method according to claim 1 wherein said matrix is an inorganic solid support.

3. The method according to claim 2 wherein said inorganic solid support is selected from the group consisting of silica, alumina and zeolites.

4. The method according to claim 1 wherein said matrix is an organic solid support.

5. The method according to claim 4 wherein said organic solid support is selected from the group consisting of cellulose, agarose, dextran, polyacrylates, polystyrene and polyacrylamide.

6. The method according to claim 4 wherein said ethylenically unsaturated functionality comprises a terminal olefin of the formula $>C=CH_2$.

7. The method according to claim 6 wherein said terminal olefin is an allyl group.

8. The method according to claim 7 wherein said allyl group is derived from a reactive allyl group selected from the group consisting of allyl halide and allyl glycidyl ether.

9. The method according to claim 1 wherein said ligand is covalently attached to said matrix through a sulfide linkage.

10. The method according to claim 1 wherein said ligand is covalently attached to said matrix through a sulfoxide linkage.

11. The method according to claim 1 wherein said ligand is covalently attached to said matrix through a sulfone linkage.

12. The method according to claim 1 wherein said ligand comprises one or more functional groups selected from the group consisting of amino, hydrocarbylamino, dihydrocarbylamino, hydroxyl, carboxyl, sulfate, phosphate, heteroaryl, and carbamidine functionality.

13. A method for preparing chromatographic resins comprising a support matrix having ligands capable of binding a target compound covalently attached thereto through a linking group wherein said ligands comprise a terminal sulfonate functionality which method comprises:
   (a) providing a support matrix comprising ethylenically unsaturated functionality appended thereto;
   (b) contacting the matrix of (a) above with a bisulfite salt under free radical conditions sufficient to provide for covalent linkage of a sulfonate group to said matrix.

14. The method according to claim 13 wherein said matrix is an organic solid support.

15. The method according to claim 13 wherein said matrix is an inorganic solid support.

16. The method according to claim 15 wherein said inorganic solid support is selected from the group consisting of silica, alumina and zeolites.

17. The method according to claim 14 wherein said ethylenically unsaturated functionality comprises a terminal olefin of the formula $>C=CH_2$.

18. The method according to claim 16 wherein said terminal olefin is an unconjugated olefin.

19. The method according to claim 18 wherein said unconjugated terminal olefin is an allyl group.

20. The method according to claim 19 wherein said allyl group is derived from a reactive allyl group selected from the group consisting of allyl halide and allyl glycidyl ether.

* * * * *